United States Patent
Rosengren et al.

(10) Patent No.: US 11,528,840 B2
(45) Date of Patent: Dec. 20, 2022

(54) SYSTEM FOR VARIABLE-RATIO BLENDING OF MULTIPLE AGRICULTURAL PRODUCTS FOR DELIVERY VIA A PORTED OPENER

(71) Applicant: CLEAN SEED AGRICULTURAL TECHNOLOGIES LTD., Burnaby (CA)

(72) Inventors: Colin Mark Rosengren, Midale (CA); Robert Sydney Ruff, Burnaby (CA); Charles Joseph Schembri, Burnaby (CA); Gordon Blair Wilson, Burnaby (CA)

(73) Assignee: Clean Seed Agricultural Technologies Ltd., Burnaby (CA)

( * ) Notice: Subject to any disclaimer, the term of this patent is extended or adjusted under 35 U.S.C. 154(b) by 222 days.

(21) Appl. No.: 16/717,517

(22) Filed: Dec. 17, 2019

(65) Prior Publication Data
US 2020/0120857 A1 Apr. 23, 2020

Related U.S. Application Data

(62) Division of application No. 15/045,007, filed on Feb. 16, 2016, now Pat. No. 10,542,663, which is a
(Continued)

(51) Int. Cl.
*A01C 7/10* (2006.01)
*A01C 7/06* (2006.01)
(Continued)

(52) U.S. Cl.
CPC .............. *A01C 7/102* (2013.01); *A01C 7/06* (2013.01); *A01C 7/20* (2013.01); *A01C 19/02* (2013.01);
(Continued)

(58) Field of Classification Search
CPC ......... A01C 7/102; A01C 7/20; A01C 21/005; A01C 19/02; A01C 7/06; A01C 15/003; A01C 5/062; G01C 21/30
See application file for complete search history.

(56) References Cited

U.S. PATENT DOCUMENTS 5,913,369 A   6/1999  Bodie et al.
5,931,882 A * 8/1999  Fick ..................... A01B 79/005
                                                  701/50
(Continued)

FOREIGN PATENT DOCUMENTS

CA       2247788 C      1/2007
WO    2011/037525      3/2011

OTHER PUBLICATIONS

Weinmuller, C, European Search Report for EP 13 88 4862, dated Nov. 4, 2016, 4 pages, European Patent Office, The Hague, Netherlands.
(Continued)

*Primary Examiner* — Thomas Ingram
(74) *Attorney, Agent, or Firm* — Antony C. Edwards

(57) ABSTRACT

A system to meter multiple agricultural products according to an independently prescribed rate for each in a variable-ratio blend of the agricultural products from a single opener in a plurality of such systems and openers across an applicator such as a drill. Bulk storage compartments associated with the applicator deliver multiple agricultural products to metering assemblies mounted in clusters or pods across the applicator. The agricultural products are fed from the metering assemblies, via a flow re-director, into a manifold, and then into a corresponding single opener having conduits to transport the agricultural product into the soil. Controllers independently regulate metering by the metering assemblies. The flow re-director and manifold provide blending of
(Continued)

combinations of the agricultural products for each opener according to a field prescription.

11 Claims, 29 Drawing Sheets

Related U.S. Application Data division of application No. 14/891,002, filed as application No. PCT/CA2013/000466 on May 13, 2013, now Pat. No. 9,907,224.

(51) Int. Cl.
*A01C 7/20* (2006.01)
*A01C 21/00* (2006.01)
*A01C 23/02* (2006.01)
*A01C 19/02* (2006.01)
*G01C 21/30* (2006.01)
*A01C 5/06* (2006.01)
*A01C 15/00* (2006.01)

(52) U.S. Cl.
CPC .......... *A01C 21/005* (2013.01); *A01C 23/025* (2013.01); *G01C 21/30* (2013.01); *A01C 5/062* (2013.01); *A01C 15/003* (2013.01)

(56) References Cited

U.S. PATENT DOCUMENTS

| | | | | |
|---|---|---|---|---|
| 7,347,149 B2 * | 3/2008 | Mayerle | ................... | A01C 7/06 111/175 |
| 7,380,733 B2 * | 6/2008 | Owenby | .............. | A01C 15/122 239/656 |
| 8,141,504 B2 * | 3/2012 | Dean | ....................... | A01C 7/081 111/179 |
| 2001/0019087 A1 * | 9/2001 | Andersonn | .......... | A01C 21/005 239/650 |
| 2007/0034721 A1 * | 2/2007 | Owenby | .............. | A01C 15/122 239/656 |
| 2007/0039880 A1 * | 2/2007 | Mayerle | ................. | A01C 7/102 210/612 |
| 2008/0047475 A1 * | 2/2008 | Stehling | ................. | A01C 7/081 111/69 |
| 2011/0046776 A1 * | 2/2011 | Goldman | ............... | A01C 7/105 700/225 |
| 2011/0178632 A1 * | 7/2011 | Straeter | .................... | A01C 7/10 700/219 |
| 2016/0095274 A1 * | 4/2016 | Wendte | ................ | A01C 21/005 111/177 |
| 2017/0086352 A1 * | 3/2017 | Frasier | ................... | A01C 7/081 |

OTHER PUBLICATIONS

Abounehme, Sam, International Search Report for PCT/CA2013/000466, dated Jan. 10, 2014, 2 pages, Canadian Intellectual Property Office, Gatineau, Quebec, Canada.

How, Yew-Seng, Australian Examination Report No. 1 for Application No. 2013389965, dated Feb. 16, 2017, 4 pages, IP Australia, Australia.

Kumar, Vinod, Indian Examination Report for Application No. 10976/DELNP/2015, dated Dec. 31, 2019, 6 pages, Intellectual Property India, Delhi, India.

Zhang, Zihao, State Intellectual Property Office of the People's Republic of China Search Report for Application No. 201380078175.8, 3 pages, China.

* cited by examiner

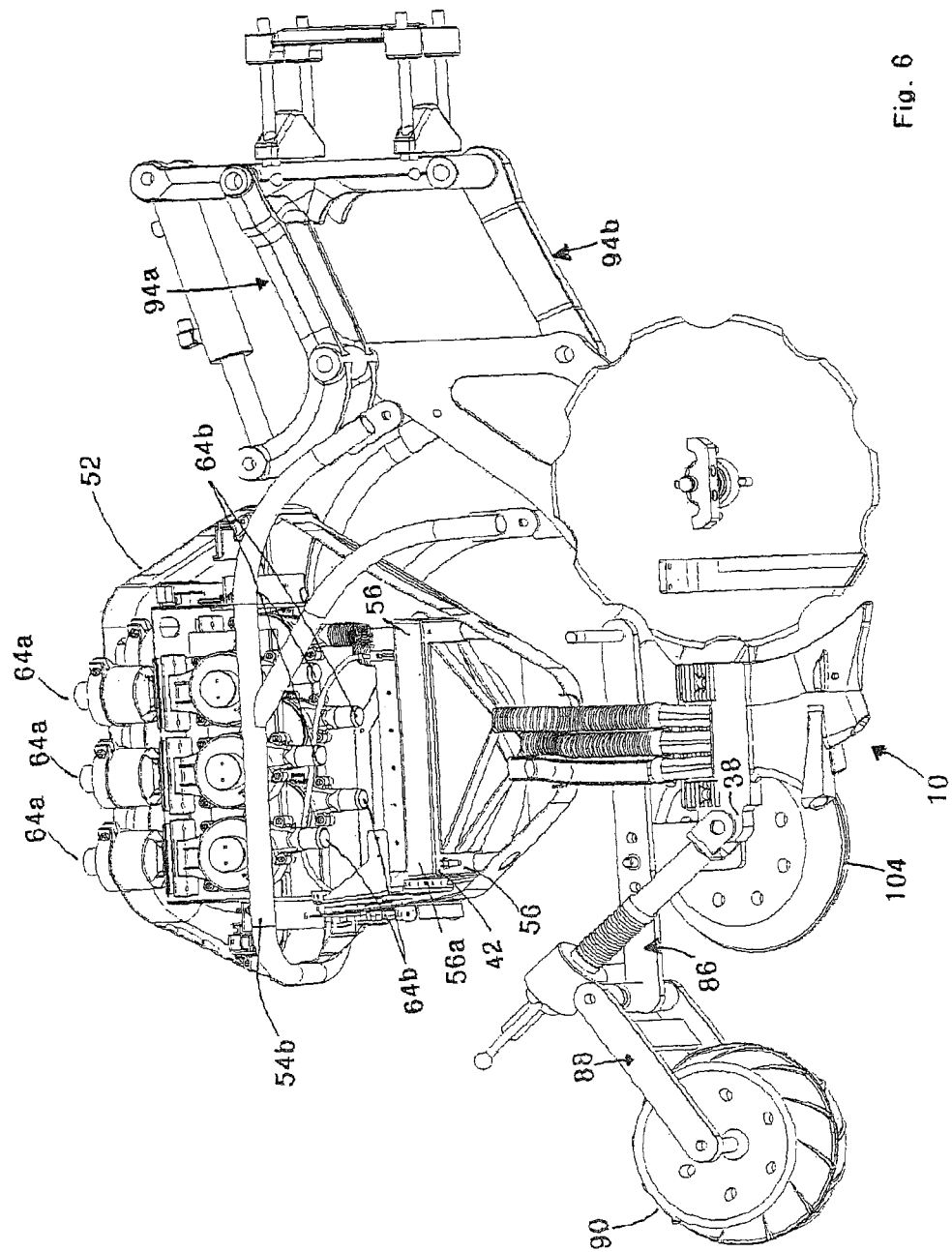

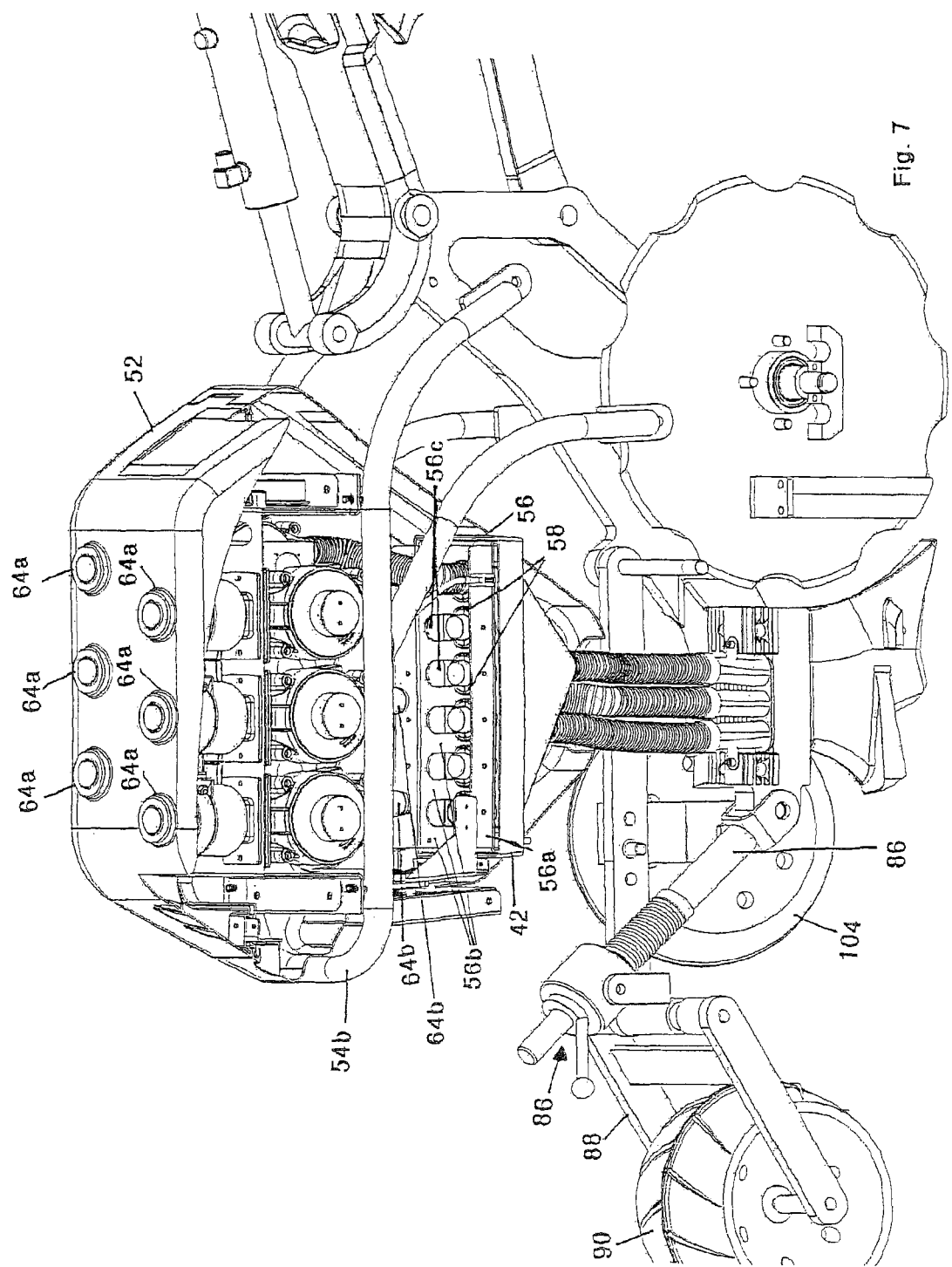

METERING DEVICE-TO-OPENER OUTLET MAPPING CHART

| Number of Metering Devices Delivering to $1^{st}$ Opener Outlet | Number of Metering Devices Delivering to $2^{nd}$ Opener Outlet | Number of Metering Devices Delivering to $3^{rd}$ Opener Outlet |
|---|---|---|
| 6 | 0 | 0 |
| 5 | 0 | 1 |
| 5 | 1 | 0 |
| 4 | 1 | 1 |
| 4 | 0 | 2 |
| 4 | 2 | 0 |
| 3 | 0 | 3 |
| 3 | 1 | 2 |
| 3 | 2 | 1 |
| 3 | 3 | 0 |
| 2 | 0 | 4 |
| 2 | 1 | 3 |
| 2 | 2 | 2 |
| 2 | 3 | 1 |
| 2 | 4 | 0 |
| 1 | 0 | 5 |
| 1 | 1 | 4 |
| 1 | 2 | 3 |
| 1 | 3 | 2 |
| 1 | 4 | 1 |
| 1 | 5 | 0 |
| 0 | 0 | 6 |
| 0 | 1 | 5 |
| 0 | 2 | 4 |
| 0 | 3 | 3 |
| 0 | 4 | 2 |
| 0 | 5 | 1 |
| 0 | 6 | 0 |

Figure 24

SYSTEM FOR VARIABLE-RATIO BLENDING OF MULTIPLE AGRICULTURAL PRODUCTS FOR DELIVERY VIA A PORTED OPENER

FIELD OF THE INVENTION

This invention relates to the field of agricultural machinery related to seed drills and the like having variable rate metering systems useful in prescription farming, and in particular to a system for variable-ratio blending of multiple agricultural products for delivery via a multi-ported opener. An applicator such as a drill combines centralized delivery of the agricultural product including seeds and fertilizer with localized, high resolution, individually controlled, variable rate metering and variable-ratio blending of the multiple agricultural products at each opener in a lateral array of metering assemblies and corresponding openers, wherein each opener is fed from a multiplicity of metering devices and corresponding local hoppers for each metering device.

BACKGROUND OF THE INVENTION

Prescription farming is described in U.S. Pat. No. 6,122,581 which issued Sep. 19, 2000, to McQuinn entitled Multi-Variable Rate Dispensing System for Agricultural Machine. As stated by McQuinn, there is a need for a variable rate applicator system for controlling delivery of agricultural products, also referred to by McQuinn as crop inputs, being dispensed from dispensing points across a spreader boom, planter, seeder and various other applicator devices substantially transverse to their direction of travel so as to accurately and precisely dispense agricultural products individually from multiple dispensing points attached to the applicator machine as the machine traverses a desired product delivery area. McQuinn notes that significant changes in soil conditions, topographical features, and/or characteristics such as nutrient levels, soil compaction, drainage or other qualifying crop production characteristics, have been found to occur even within a distance of a few feet. McQuinn describes simultaneously controlling the prescription and quantity of multiple agricultural products dispensed from multiple dispensing points attached to a variable rate product applicator machine so as to provide a multi-variable rate dispensing system wherein a digital map is used to coordinate the system. The map is customized to apply agricultural products to a desired target area being traversed by the application machine regardless of crop input prescription and quantity requirement differences at individual dispensing point locations across the machine. A computerized control system is described which holds a digital map of the location of various soil types, topographical features, and/or characteristics such as nutrient levels, soil compaction, drainage or other qualifying crop production characteristic in the field to be treated, and is responsive to machine locating devices such as GPS receivers for determining the location of the machine in the field, looking up the soil type, topographical features, and/or qualifying crop production characteristics of the soil the machine is currently over based upon its location, and simultaneously adjusting the crop input prescription and quantity for each individual dispensing point in response thereto.

McQuinn describes the map coordinated system as allowing for variable input control in the horizontal plane from one side to the other, either by section control wherein several dispensing points are grouped together, or through individual dispensing point control. McQuinn states that, when utilized for planting or seeding applications, it may also be necessary to instruct different points on the machine to dispense different varieties of seeds and/or vary the rate of seeds to be dispensed therefrom so as to control the rates and or varieties of the seeds dispensed from the machine in a direction that is transverse to the direction of machine travel. McQuinn continues, stating that controlling these variable delivery rate differences is necessary when crop inputs are simultaneously dispensed from different dispensing points on the application machine, each delivering a unique and distinct prescription and quantity of crop inputs in response to the computerized control system which holds the digital soil map of the location of various soil types, topographical features, and/or any qualifying crop production characteristics in the field to be treated.

McQuinn states that the application of any product to be dispensed is matched with the crop input prescription and quantity requirements for the field reference point unique to each respective dispensing point or group of dispensing points. McQuinn further states that the rate and prescription of crop inputs dispensed from each respective dispensing point is adjusted so that each crop input is dispensed for a specific target area of predetermined conditions, all based upon formerly measured conditions and values for that certain target area. McQuinn describes that crop inputs are determined by the application machine operator and may include products such as herbicides, insecticides, fertilizer, and various chemicals, and may also include or be limited to seeds exclusively to accommodate planter control. McQuinn describes using data processors to extract prescription and quantity data which has been programmed into a software database. McQuinn describes that database information also includes that which is specific to the applicator machine and includes the type and location of each dispensing point or group of dispensing points, giving the examples of spray nozzles, spreading wheels, injection tubes, and associated actuators. McQuinn states that his multi-variable rate dispensing system is adaptable for use with dry boom systems, or combinations of dry boom systems and wet boom systems, as well as planters, drills, spinners, drop tubes, injectors, etcetera.

Applicant is also aware of U.S. Pat. No. 5,931,882, to Fick which issued Aug. 3, 1999, for a Combination Grid Recipe and Depth Control System. Fick describes a multi-product application system, seed planting system and control for the dispensing of liquid or granular products in pre-selected amounts and planting seeds at pre-selected depths and frequencies, where three or more separate products can be dispensed simultaneously and wherein the seed planting depth can be varied. A grid recipe system defines the amounts of each type of product to be applied to specific areas of the field and/or which defines seed planting depths and frequencies for specific areas of the field. GPS and the recipe data is processed by a computer. The recipe and/or depth/frequency grid is created by the farmer based on personal knowledge and experience. Fick describes that the products being dispensed may be fertilizers, herbicides, insecticides, fumigants, carriers, seeds or other similar materials which are applied in either liquid or granular form. He states that the term recipe is intended to encompass chemical recipes, dispense rates, as well as seed planting depths and frequencies, and that the control system uses GPS to provide the location of the product applicator.

Fick describes that five separate product containers may contain five different types of products which may be applied simultaneously via a single manifold feeding an in-line mixing device used to thoroughly mix the flow, from which the flow is directed out through controlled valves to the booms and dispensing nozzles. Fick states that the depth control unit may be driven mechanically, electrically or hydraulically.

SUMMARY OF THE INVENTION

In one aspect of the present invention quantity and ratios of dispensed seed and fertilizer are controlled by a metering system which consists of a lateral array of pods each containing in the range of four to six or more individually controlled metering devices, preferably metering wheels and cup dispensers that are individually driven by electric motors. The motors are controlled by a pod microcontroller processor which receives commands from a main controller processor for dispensing rates. Each pod controller has a specific identification, which allows the pod controllers to be chained together through a communication network. The interconnected pods are managed by the main system controller which interprets user input commands, including field prescription files, for metering rates and for any errors that may occur during normal operation.

In the preferred embodiment granular agricultural product to be metered is delivered by an air system from a central bulk storage on the drill to the metering wheels mounted in their corresponding cups within each pod in the series of pods. Each metering wheel has its own driver motor and its own local hopper. Each local hopper may be fed different granular product from the central bulk storage. The pods are mounted in an array laterally across the drill and granular product is fed from the metering wheels through a series of tubes and manifolds. Preferably each pod has a single manifold and a single opener. Each manifold feeds its corresponding opener. The opener contains conduits for transport of the agricultural product into the soil.

Once the product reaches the local hoppers on each metering pod from the central bulk storage on the drill, the main controller assesses the required product feed ratios and adjusts each of the four to six or more wheel motors per pod to the appropriate speed in order to dispense up to the corresponding number of different products at the spread-density according to a field prescription file, and the main controller also adjusts for turns made on the field by the drill and for overlaps in the drill spread pattern on the field. This provides for individual feed rate control of each product at each outlet of each opener, which allows for complete control over seed/fertilizer ratios which are dispensed as combinations dictated by the manifold set-up and opener conduit configuration to maximize efficiency and reduce waste. The result increases crop yields with lower costs to the farmer by minimizing over-seeding.

The agricultural products are metered at the opener for minimal delay in product movement times which means less overlap and more accurate application. That is, current technology on the market has a delay in delivery time of 1 second to 4 seconds depending on location on the drill, and the length of hose the product has to go through to get to the opener. Therefore even with sectional control for shutoff, overlap is necessary just to guarantee coverage. In the present invention the delay is consistent across the drill and can then be accurately built into metering for exact control of on/off points and rates. Efficiency is increased by the use of convertible road-to-field nurse trailers for on-the-fly resupplying of the central bulk storage bins on the drill.

Each metering wheel motor may be a stepper motor controlled by pulses sent to the corresponding stepper motor drivers from commands from the main controller and interpreted by the pod controller. Each controller is responsible for managing the motor speeds of the stepper motors in its pod to deliver seed and fertilizer based on the user data input, location, prescription, and velocity.

In one aspect the system according to the present invention includes a bulk tank associated with a seeding drill wherein the bulk tank has at least four bulk compartments, a seeding drill having at least one arm, and conventionally two oppositely laterally disposed arms, an array of metering pods mounted in laterally spaced apart array along the arms of the seeding drill, wherein the array has an opener density along the arm, that is, spacings between the pods to replicate, subject to machine constraints, a lateral resolution of laterally spaced apart data points in a field prescription. Each metering pod in the array of metering pods includes at least four metering assemblies so as to provide a one-to-one correspondence between the at least four bulk compartments of the bulk tank and the at least four metering assemblies. Each pod may include a selectively adjustable ground height adjustment actuator. A supply means such as an air seeder or other bulk conveyor supplies different agricultural products from each of the bulk compartments in a one-to-one correspondence between a bulk compartment and a corresponding metering assembly of the at least four metering assemblies in each pod.

Each metering assembly includes a local hopper communicating the corresponding agricultural product to a selectively and individually actuatable metering dispenser, herein also referred to as a metering device. The metering dispenser meters the agricultural product at a selectively variable rate via selectively adjusting flow re-direction such as upper conduits to a manifold and via the manifold into a corresponding opener. As used herein the term manifold is intended to mean a chambered flow-control device that controls and directs flows of incoming agricultural products through dividing chambers or compartments, wherein each compartment has at least one corresponding outflow outlet. The opener has a plurality of conduits, referred to herein also as lower conduits, therethrough and corresponding opener outlets at a lower end of the opener, whereby the agricultural product is transported from the manifold, downwardly through the plurality of lower conduits, and out through the opener outlets. The agricultural product is thereby delivered by the opener into soil in the field in a desired combination of products, at desired delivery rates and at a desired depth in the soil.

Using data inputs from the user and inputs from the field prescription, and location inputs from a location device such as a GPS locator, and velocity input from a velocity sensor or velocity determining device, at least one processor on the drill correlates the location of the drill on the field with the field prescription and communicates individual metering instructions to each of the metering dispensers in each of the pods so as to dispense to each corresponding opener a uniquely regulated combination of the agricultural products and so as to provide a delivery rate to accomplish a desired delivery rate and thus product spread density of each combination according to the field prescription for the particular location on the field.

In the preferred embodiment, which is not intended to be limiting, the product is granular product. Consequently, each metering dispenser in the preferred embodiment advantageously includes a metering roller rotatably mounted within a metering cup so as to form a dispensing nip for dispensing singulated product to the manifold. This form of accurate metering of granulated agricultural product is not however intended to be limiting, as one skilled in the art would appreciate that other forms of accurate metering devices, whether now known or as will be developed in the future, would also work in place of the use of a metering roller and cup arrangement. The manifold has a plurality of the manifold compartments corresponding in number to the number of lower conduits in the corresponding opener.

Advantageously, each of the flow redirectors operating between the metering devices and the manifold compartments is selectively directable into any one of the manifold compartments so as to provide for uniquely combining the products from the metering assemblies into any one of the lower conduits in the opener. For example, the flow redirectors may be flexible hoses. The lower ends of the hoses are adjacent the manifold compartments and are selectively positioned over a desired manifold compartment. Other forms of a desired flow re-director, whether flexible or not, or whether hoses or not, would also work. For example the flow re-directors could be rigid chutes, one for each metering device, wherein each chute has an actuatable door, or gate, or slide, or shutter for each manifold compartment.

The number of actuatable doors, gates, slides, shutters, etc. would correspond to the number of conduits/outlets in the opener being fed. The number of chutes, which may also be flumes, channels, tubes, ducts, etc., is equal to the number of metering devices. In the present invention the number of metering devices exceeds the number of available conduits/outlets in the corresponding opener thereby providing the opportunity to adjust, and optimize according to the field prescription, what is being delivered from the opener at any particular field location.

The reference herein to actuatable flow redirectors is intended to include flow re-direction mechanisms of any kind, whether conduits, etc., or not, so as to include for example the instance where the metering device itself, for example the position of the singulating nip or the orientation of the wheel cup, is angularly or otherwise adjusted or re-positioned so that the outflow from the nip specifically on the wheel cup generally is selectively varied to direct the outflow to a particular manifold compartment feeding a corresponding conduit in the opener.

The reference herein to the use of local hoppers for each metering device or assembly is not intended to be limited to hoppers per se, but may be any kind of suitable container or reservoir for the product being metered so as to provide for the continuous accurate metering of the product by the metering device with the metering assembly. Further, the local hopper need not necessarily be physically mounted to a metering device as it may be near or adjacent the metering device and feed the metering device via its own conduit in the event that the size or shape of the pod requires it. Further, the arrangements of the local hopper and metering devices may be organized to provide a narrow pod, narrow in the sense of taking up only a small distance along the drill arm on which the pods are mounted so as to increase the number of openers on the arm and thus increase the resolution of the product delivery.

Further, the reference herein to the use of pods mounted along each arm on the drill is not intended to be limiting. In particular it is not intended that reference to a pod is to necessarily indicate a separate, independent housing so that there must be a series of such housing mounted along the drill arm. It may be that as the required opener density increases, that is, the number of openers per length of drill arm increases, that the housings for each grouping of metering devices per opener will merge into a unitary or segmented housing, each having a number of groupings of metering assemblies within. Consequently it may be that a pod is merely a reference to the grouping of metering assemblies feeding one opener, whether or not there is a separate housing over each such grouping.

In the preferred embodiment each of openers has at least three lower conduits, and each of the pods has at least four metering assemblies. One set of flow re-directors and one manifold cooperate between each pod and each cooperates between each pod and each opener. The associated bulk storage tank has at least four bulk storage compartments. In such an apparatus the field prescription has at least four data layers.

The system according to a further aspect of the present invention may further include at least one road-to-field convertable nurse trailer. The nurse trailer is releasably mountable to, for towing behind the drill for field use and for towing behind a tow vehicle for road use. The nurse trailer includes a plurality of bulk transport compartments equal in number to, or exceeding in number, the number of the bulk compartments in the bulk storage tank. The nurse trailer further includes a product transfer means, such as a second air seeder, to transfer product from the transport compartments on the nurse trailer to the bulk storage compartments, for filling the bulk storage compartments from the corresponding transport compartments, for example on-the-fly while the drill is in forward translation.

In one embodiment the nurse trailer has road-use wheels on a first end of the trailer and field-use wheels on an opposite second end of the trailer, and wherein, for the field-use, the first end of the trailer is attached to the drill for towing of the trailer, wherein the road-use wheels are mounted on the trailer so as to elevate out of contact with the field during the field-use of the trailer, and wherein, for the road-use, the second end of the trailer is attached to the tow vehicle for towing of the trailer, wherein the field-use wheels are mounted on the trailer so as to be elevated out of the contact with the road during the mad-use of the trailer.

The number of bulk storage compartments in the bulk storage tank of the drill depends on the number of metering assemblies per pod. If for example, as illustrated herein there are six metering assemblies per pod then there are at least six bulk storage compartments or containers.

A method for optimizing the use of a field for the growing of crops may include:
  a) providing an apparatus such as described above for the optimized delivery of the agricultural product based on location, velocity, ground factor variables, and characteristics of the agricultural product,
  b) providing:
    (i) a seed drill which is translatable in at least a forward direction so as to follow in an optimized path over the field,
    (ii) a location-determining device such as a GPS locator for receiving and outputting location information for the drill,
    (iii) a bulk storage compartments associated with the seed drill, and a selectively controllable bulk feeder system cooperating with the bulk storage compartments, wherein the feeder system delivers agricultural product from the bulk storage compartments to each metering assembly in a one-to-one correspondence,
  c) separately storing the unique agricultural products in the bulk storage compartments so that a single type of agricultural product is stored in a corresponding single bulk storage compartment, wherein the agricultural products are chosen from the group, including:
    (i) seed varieties
    (ii) fertilizer compounds (iii) herbicide compounds
(iv) inoculants
(v) insecticides
d) feeding the agricultural products from the bulk storage compartments to the corresponding metering assemblies,
e) providing upper conduits cooperating between the metering devices and the manifold, and adjusting the delivery of the upper conduits so as to customize a combination of the products for delivery to the conduits in the opener,
f) providing in each metering assembly: a local hopper and a corresponding independently driven selectively controllable metering device, providing a flow re-director for each metering device directing flow into a manifold, and a corresponding opener for receiving the flow from the manifold, and arranging an array of pods, each containing a plurality of metering assemblies, in a laterally-spaced array across each arm of the seed drill so as to provide lateral resolution substantially in the range of 1-2 feet between adjacent openers,
g) within the processor:
  (i) receiving the location information,
  (ii) receiving ground factor information for the field from the prescription file, wherein the ground factor information for the field includes information which is mapped to the field and chosen from the group comprising:
    (i) ground elevation
    (ii) ground moisture content
    (iii) ground porosity
    (iv) ground pH level
    (v) nitrogen level
    (vi) potassium level
    (vii) sulphur level
    (viii) phosphorus level
    (ix) ground hardness/texture
    (x) desired seeding depth
    (xi) electrical conductivity
    (xii) soil organics
    (xiii) soil bulk density
  (iii) correlating the location information to corresponding ground factor information for the field,
  (iv) determining optimized metering instructions from the ground factor information corresponding to the location information,
(h) communicating the metering instructions to the plurality of selectively controllable metering assemblies,
(i) receiving feedback in the processor from the plurality of selectively controllable metering assemblies,
(j) displaying status information to a user in the vehicle,
(k) independently driving the metering assemblies so as to selectively meter the agricultural product from the local hoppers according to the metering instructions from the processor so as to provide optimized combinations of the agricultural product to each opener according to the prescription for the field,
(l) actively monitoring and updating the location information in the processor and actively updating the corresponding ground factor information according to the prescription and correspondingly updating the optimized metering instructions, and communicating the updated metering instructions so as to modify the selective metering of the agricultural product according to the field prescription corresponding to the new location on the field,
(m) providing feedback from the plurality of selectively controllable metering assemblies to the processor,
(n) updating the status information to the user.

In one embodiment the nurse trailer has road-use wheels on a first end of the trailer and field-use wheels on an opposite second end of the trailer, and wherein, for the field-use, the first end of the trailer is attached to the drill for towing of the trailer, wherein the road-use wheels are mounted on the trailer so as to elevate out of contact with the field during the field-use of the trailer, and wherein, for the road-use, the second end of the trailer is attached to the tow vehicle for towing of the trailer, wherein the field-use wheels are mounted on the trailer so as to be elevated out of the contact with the road during the road-use of the trailer.

BRIEF DESCRIPTION OF THE DRAWINGS

In the present specification wherein like reference numerals denote corresponding parts in each view:

FIG. 6 is a side-on lower perspective view of the pod of FIG. 5 with the seed metering assembly housing shown partially cut-away.

FIG. 7 is, in side-on top perspective view, the pod of FIG. 6.

FIG. 24 is a Metering Device-to-Opener Outlet Mapping Chart

DETAILED DESCRIPTION OF PREFERRED EMBODIMENTS

Figure 1:
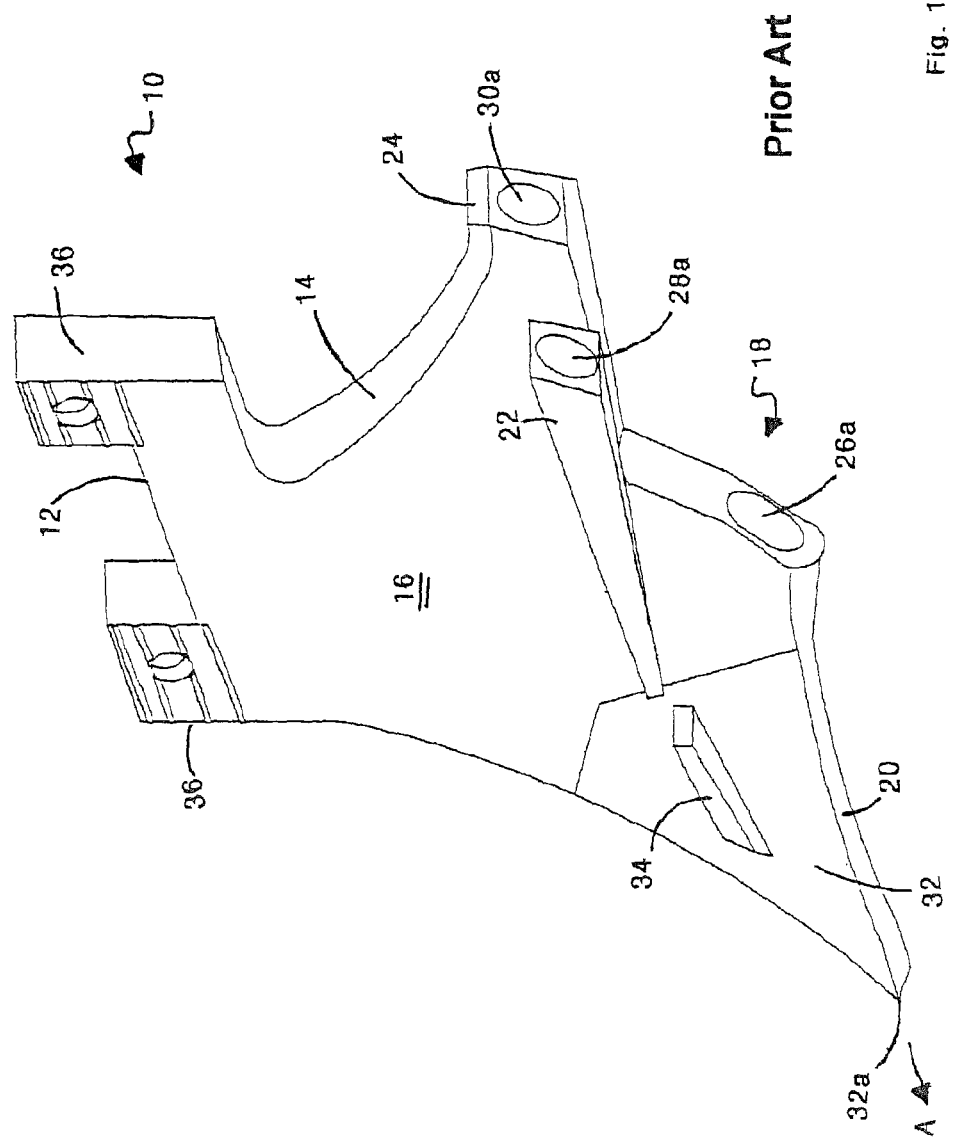
FIG. 1 is a rear perspective view of a prior art opener.

One of the objects of prescription farming is of course to increase crop yield. In view of the very large size of many farms, it is also important to those farmers to be productive and efficient while operating their seed drills according to a particular field's prescription. Thus, in order to obtain the increased yield using prescription farming methods such as described above by McQuinn, and as described above as a method of use, in conjunction with the various aspects of the present invention, a farmer does not want to be less efficient or otherwise disadvantaged by the increased complexity of operating the seed drill. Farmers currently struggle to carry many products to the field and also position the truck, and to position the conveyor, fill and cleanout the truck and conveyor, and repeat for each product, which typically takes too long.

Optimizing crop yield using prescription farming methods not only relies on an accurate prescription for a particular field but also relies on that prescription being actually obtained in the ground by the seed drill. Thus, one object is to as closely as possible reproduce the resolution of the prescription with accuracy and without a reduction in efficiency. The efficiency of the seed drill operation is enhanced by reducing down-time for refilling of hoppers containing the agricultural products including seed and fertilizer components. In the prior art, accuracy is lost through product travel delays through long hoses, and accuracy loss through random manifold splitting of product flow.

Thus, on the seed drill according to one aspect of the present invention, and for use with both granular and liquid agricultural products, high resolution, accuracy and flexibility of combining agricultural products from a multiplicity of such products carried in independent local hoppers in each pod is obtained by using individual control of metering from each local hopper which feeds corresponding individual openers via a selectively configurable manifold system in a high resolution lateral array of openers on the seed drill. The individual small local hoppers feed corresponding metering devices; one local hopper per metering device. Each metering device is selectively controlled, and individually metered to provide individualized application of the field prescription for each opener. That is, the agricultural product is locally and individually metered to each pod's opener in the array of pods in a unique combination of agricultural products according to the field prescription, and wherein a centralized multiplicity of bulk bins or bulk storage components which move with the seed drill are used to keep the multiplicity of individual small hoppers in each pod supplied with agricultural product in a one-to-one correspondence between a bulk storage compartment and a corresponding local hopper.

In one embodiment of the system convertible road-to-field use nurse trailers, that is, nurse trailers which are adapted for both road and field use, are provided for conveying the multiplicity of agricultural products in bulk from their typically centrally located storage silos to the particular field being worked by the seed drill. The nurse trailer is towed by the seed drill for on-the-fly refilling of the bulk storage compartments associated with the seed drill. In this fashion down-time for refilling of the central bulk bins or tanks associated with the seed drill is minimized to that time required to hook up and detach the nurse trailer from the seed drill respectively prior to and following the on-the-fly refilling. One design of such a nurse trailer is discussed below without intending to be limiting.

Thus in what follows, the description of the preferred embodiment, which, again, is not intended to be limiting, commences with a description of an improved design of seed drill at the opener level, and from there describing the system by following the agricultural product flow path in reverse from the opener to its corresponding manifold, and to the corresponding metering assemblies within each pod, and from there describing the centralized bulk storage distribution system, and from there describing the on-the-fly refilling of the centralized bulk storage compartments using convertible road-to-field use nurse trailers.

Opener

Although various multi-port openers may work, in one preferred embodiment the opener employed is that described in U.S. Pat. No. 6,302,040, which issued to Lempriere on Oct. 16, 2001, for an In-line Sub-surface Seeding, Fertilizing and Watering Device (the Lempriere '040 patent). One such opener is provided by Clean Seed Agricultural Products Inc. of Vancouver, British Columbia, Canada as the Mark VII opener. In jurisdictions permitting, the Lempriere '040 patent is incorporated herein by reference. The Lempriere '040 patent describes the opener as a sub-surface seeding, fertilizing and watering device including an opening blade having first and second sides extending between a leading edge and an aft edge. The opening blade has an upper surface and a lower service extending between upper and lower edges respectively of the first and second sides of the blade. First and second wings are mounted to the first and second sides respectively in generally oppositely disposed relation so as to be canti-levered outwardly therefrom. The first and second wings extend between the first and second forward wing edges and first and second aft-opening wing apertures. Seed, fertilizer or water are dispensed through the wing apertures. Oppositely disposed, rigid canards for sub-surface soil agitation are mounted to the first and second sides, so as to extend cantilevered outwardly therefrom. The canards may be mounted between the leading edge of the blade and the first and second forward wing edges.

FIG. 1 is an illustration of an opener from the Lempriere '040 patent.

Opener 10 has an upper, ported surface 12 on top of a generally planar blade structure 14. Blade structure 14 has a trunk 16 depending generally vertically beneath surface 12. A foot structure 18 is formed as part of the lower end of trunk 16. The outer surface of trunk 16 smoothly merges into lower surface 20. Wings 22 and 24 extend laterally outwardly of trunk 16.

Figure 2:
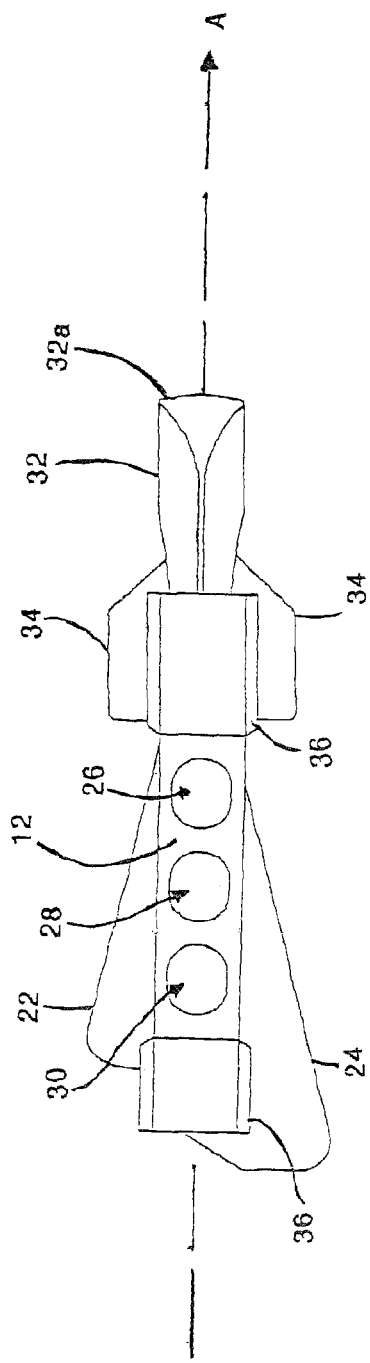
FIG. 2 is, in plan view, the prior art opener of FIG. 1.

Ports 26, 28 and 30, better seen in FIG. 2, which is also from the Lempriere '040 patent, are formed in upper surface 12 and cooperatively align with corresponding channels which extend downwardly, generally in parallel to each other, through trunk 16. The channel corresponding to port 26 extends downwardly through foot structure 18 and exits rearwardly of opener 10 via outlet port 26a. The channel corresponding to middle port 28, exits wing 22 via outlet port 28a. The channel corresponding to aft port 30 exits via wing 24 via outlet port 30a. Thus outlet ports 28a and 30a are directed generally somewhat laterally oppositely, and open from within their respective wings 22 and 24. Toe 32, which may be of hardened material, extends in a point or snout 32a which is forwardly facing in the direction of forward translation A when blade opener 10 is translated in use on the seed drill as better described below. A pair of oppositely disposed canards 34 are formed as part of, or are mounted to, foot structure 18, and in particular toe 32 so as to project cantilevored laterally outwardly of the side surfaces of toe 32. Canards 34 serve to agitate the sub-surface soil through which blade opener 10 is passing in direction A. Mounting blocks 36 are mounted on or are formed as part of surface 12. An aft ear 38 is shown added to the original Mark VII opener 10 as seen in the figures described below, for mounting adjacent to the blade depth control actuator 86.

Manifold

Figure 3:
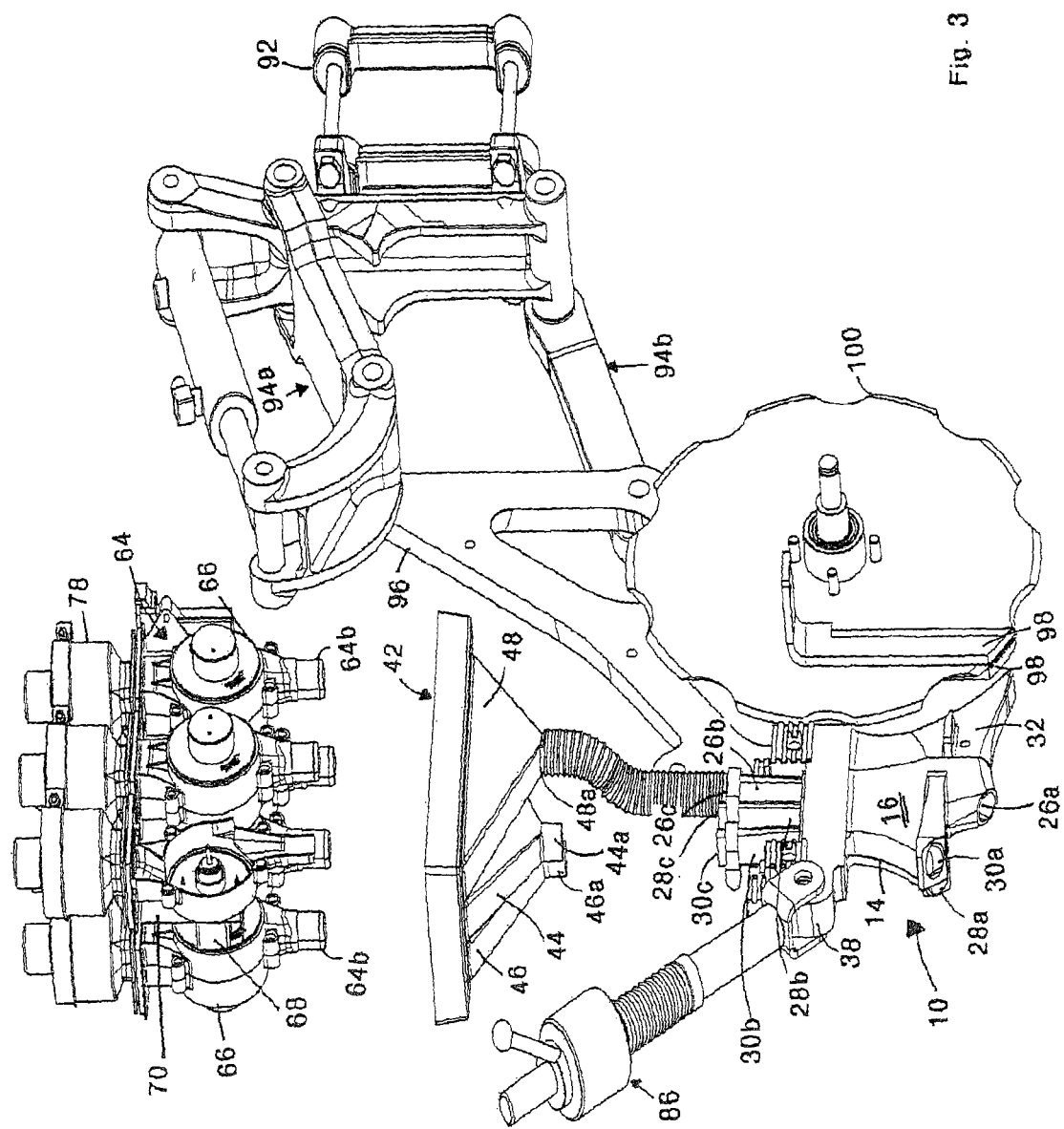
FIG. 3 is a partially cut-away rear perspective view of one metering pod from an array of metering pods mounted on a drill, wherein the pod housings, housing support frame, one side frame, and the ground engaging and closing wheels and their support frames have been removed from the view.
Figure 4:
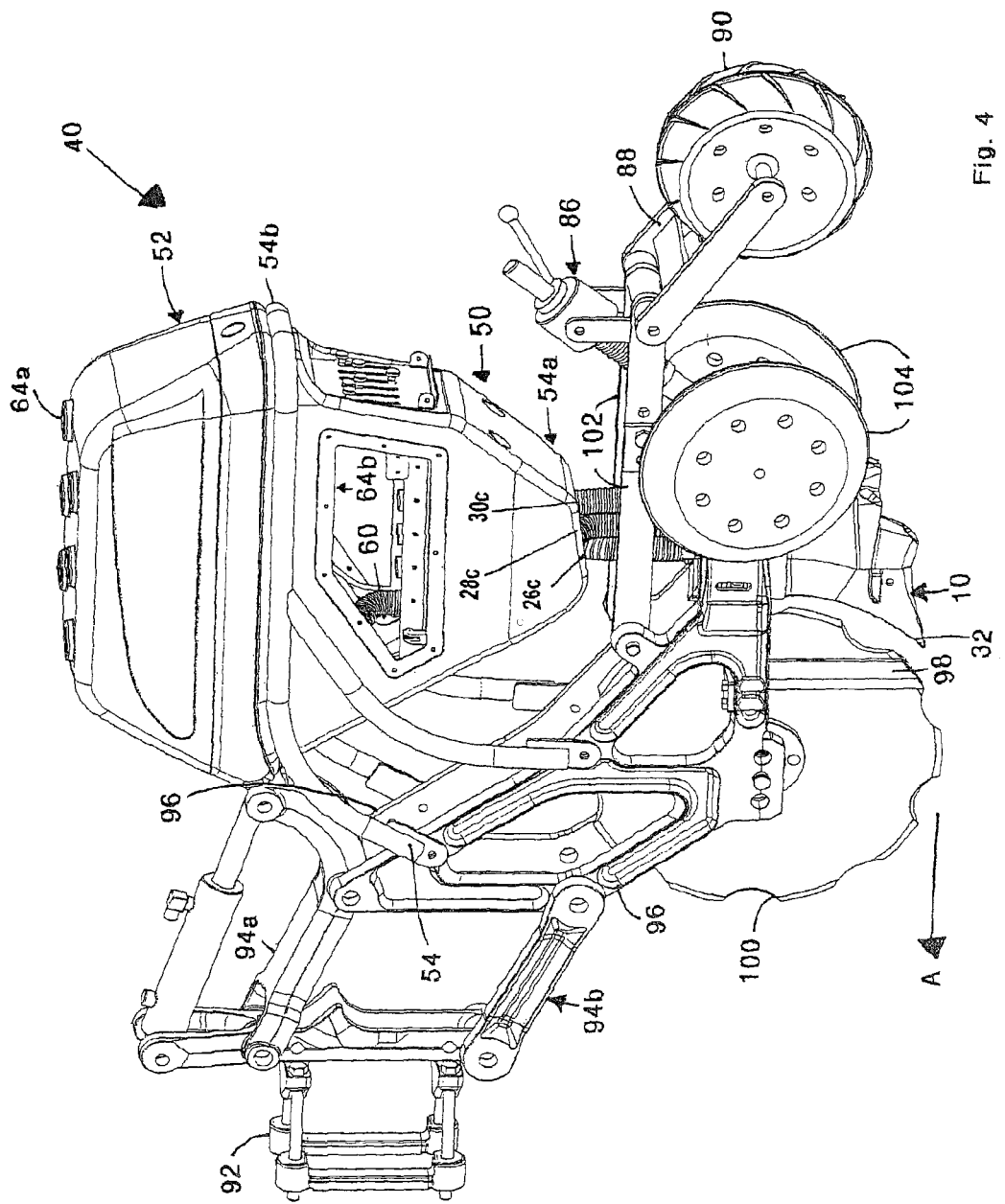
FIG. 4 is, in left rear perspective view, one entire pod assembly with the hoses removed or partially cut away.
Figure 5:
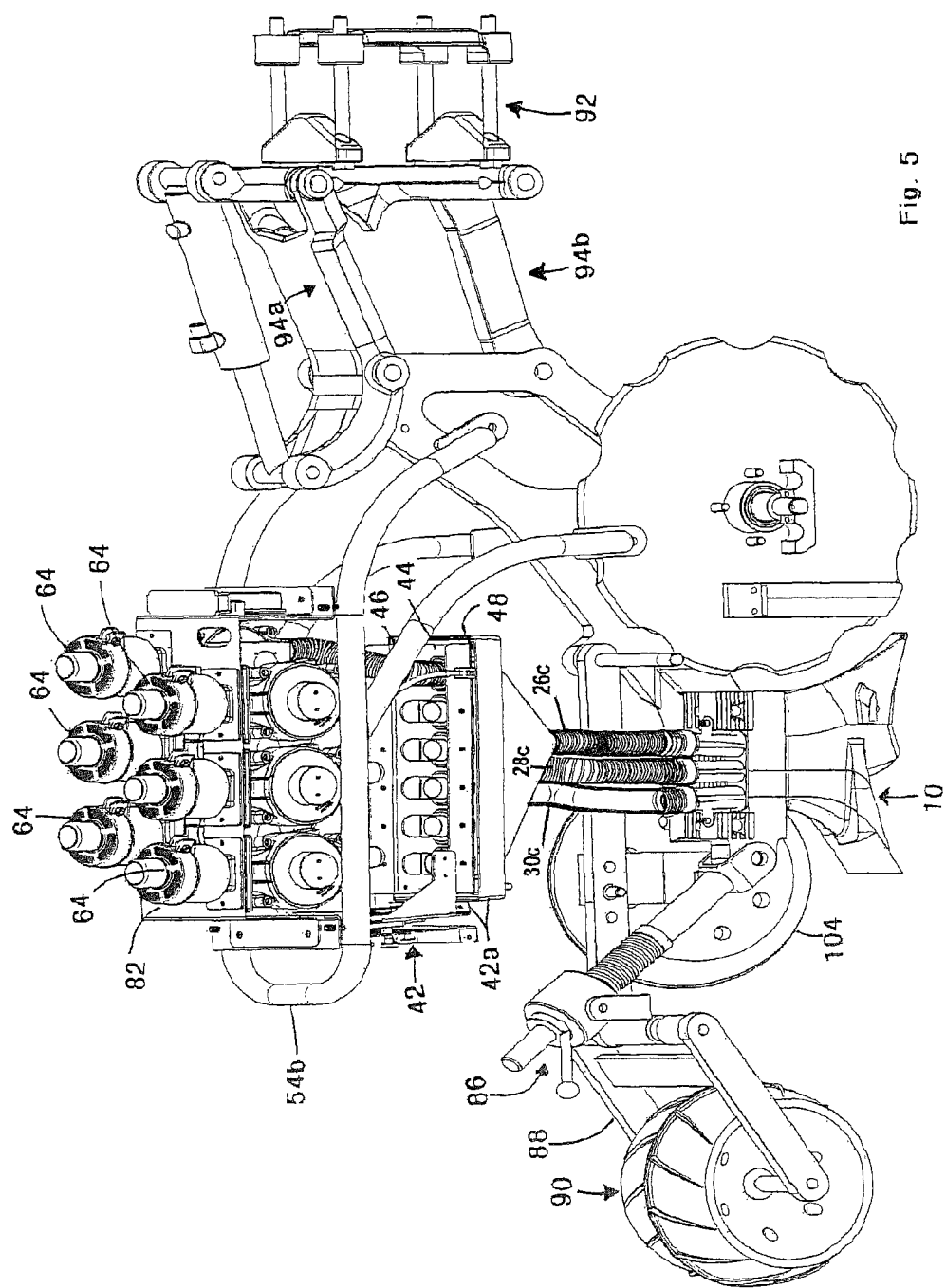
FIG. 5 is a side-on top perspective view of the pod of FIG. 3 with the housing support arm shown and with the ground engaging wheel and one closing wheel also shown.
Figure 7A:
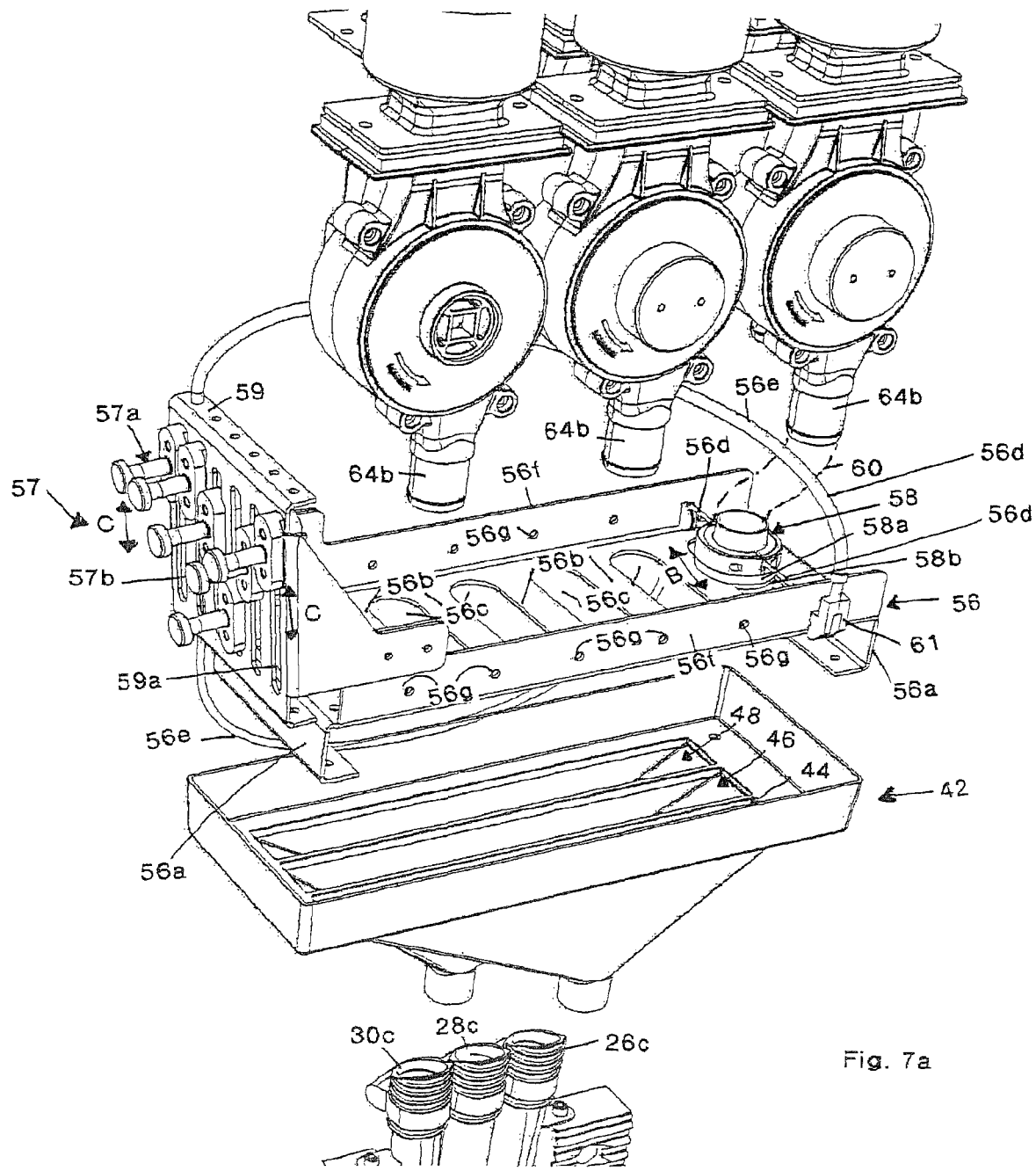
FIG. 7a is an enlarged partially exploded view of the manifold, flow re-director metering assemblies of FIG. 7.
Figure 7B:
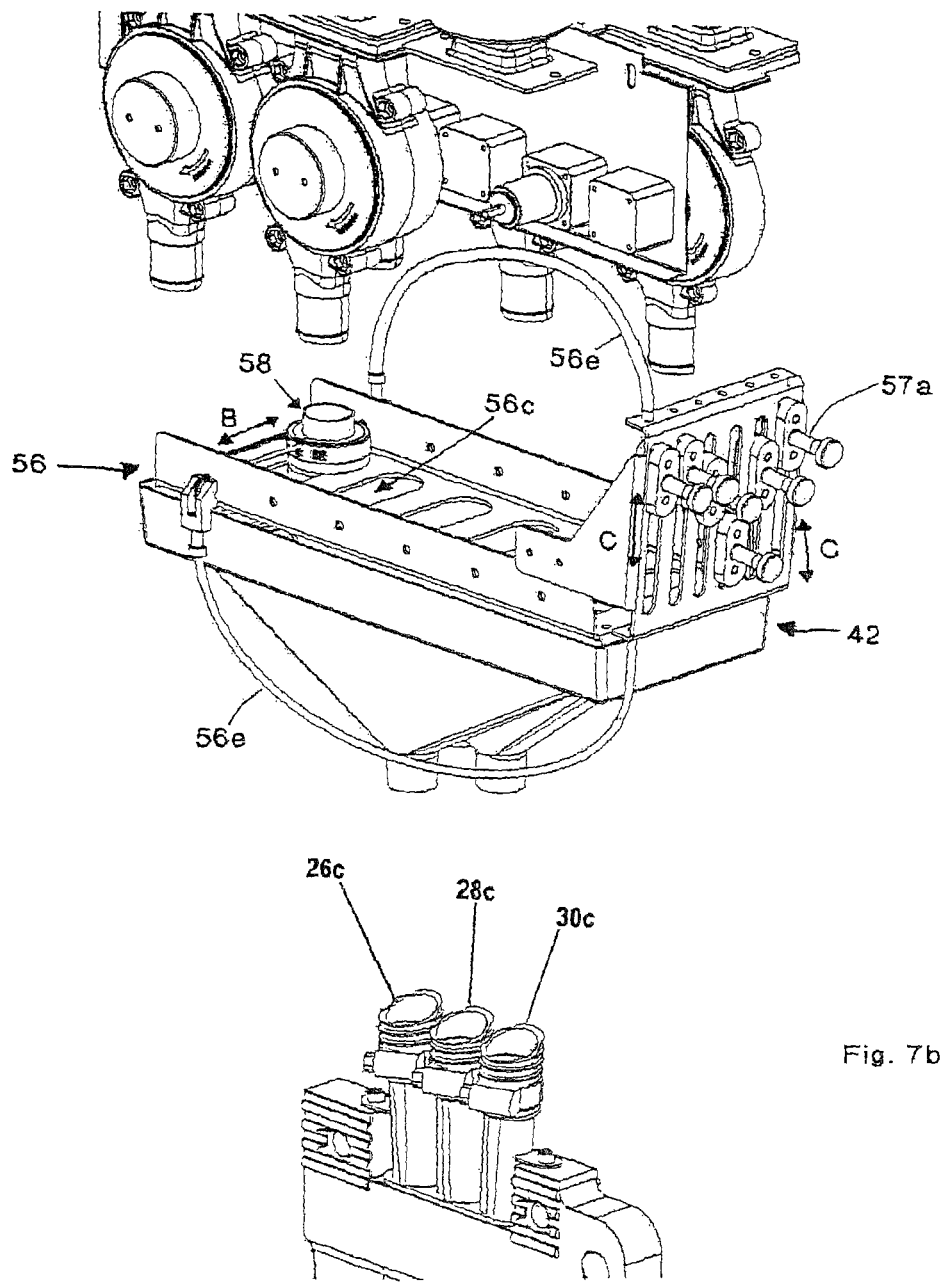
FIG. 7b is, in side-on, partially exploded and cut-away, top perspective view, the manifold, flow re-director and metering assemblies of FIG. 7a seen from the opposite side . . . .

Moving now further upstream along the agricultural product flow path, as seen in FIG. 3, which is a partially cut away view of pod 40 seen in FIG. 4, tubes 26b, 28b, and 30b are mounted into ports 26, 28 and 30 respectively. Hoses 26c, 28c and 30c, shown partially cut away in FIG. 5, are mounted to, respectively, tubes 26b, 28b, and 30b. Manifold 42, as seen in FIG. 7a, includes three elongate chambers, compartments or funnels 44, 46 and 48 having corresponding lower spouts 44a, 46a, and 48a. Hose 26c is connected to spout 44a so that the mid-funnel 44 supplies agricultural product which exits from opener 10 via the mid-outlet port 26a. Hose 28c is connected to spout 46a so that agricultural product flowing through funnel 46 exits opener 10 from the left outlet port 28a, and hose 30c is connected to spout 48a so that agricultural product flowing through funnel 48 exits opener 10 from the starboard or right outlet port 30a. Manifold 42 may be a single unitary funnel divided by dividing walls 42a so as to form funnels 44, 46, and 48. Manifold 42 may also be a collection of individual chambers, compartments or funnels.

Manifold 42 is mounted within manifold housing 50, which itself is mounted underneath metering housing 52, although, as shown, the housings 50 and 52 may be formed as a unitary housing. Manifold housing 50 and metering housing 52 are mounted onto frame 54, and in particular onto u-shaped horizontal fame arms 54a and 54b respectively.

Flow Re-Director

Within manifold housing 50, manifold 42 is supported by mounting bracket 56, better seen in FIG. 7a. Mounting bracket 56 forms a frame suspended over the openings into manifold 42, and in particular over the openings into the elongate, adjacent, parallel funnel openings of funnels 44, 46 and 48. Mounting bracket 56 has a pair of side walls 56a which sandwich manifold 42 therebetween and which mount into housing 50. Cross members 56b extend laterally across the top of bracket 56 so as to define therebetween an array of parallel, longitudinally spaced apart elongate slots 56c. In the illustrated embodiment, which is not intended to be limiting, mounting bracket 56 has six parallel slots 56c into which are mounted six selectively laterally adjustable hose supports 58.

Hose supports 58 maybe adjusted laterally in direction B across slots 56c. Laterally adjusting the position of hose supports 58 allows the selective alignment of corresponding flexible hoses 60, one of which is shown in dotted outline in FIG. 7a, so as to selectively deliver from any one or combination of the six metering assemblies 64 agricultural product into one of the three funnels 44, 46 and 48. Although only one flexible hose 60 is depicted, in dotted outline, in FIG. 7a it is understood that each of the six slots 56c would have its corresponding hose support 58 and corresponding hose 60.

Figure 7C:
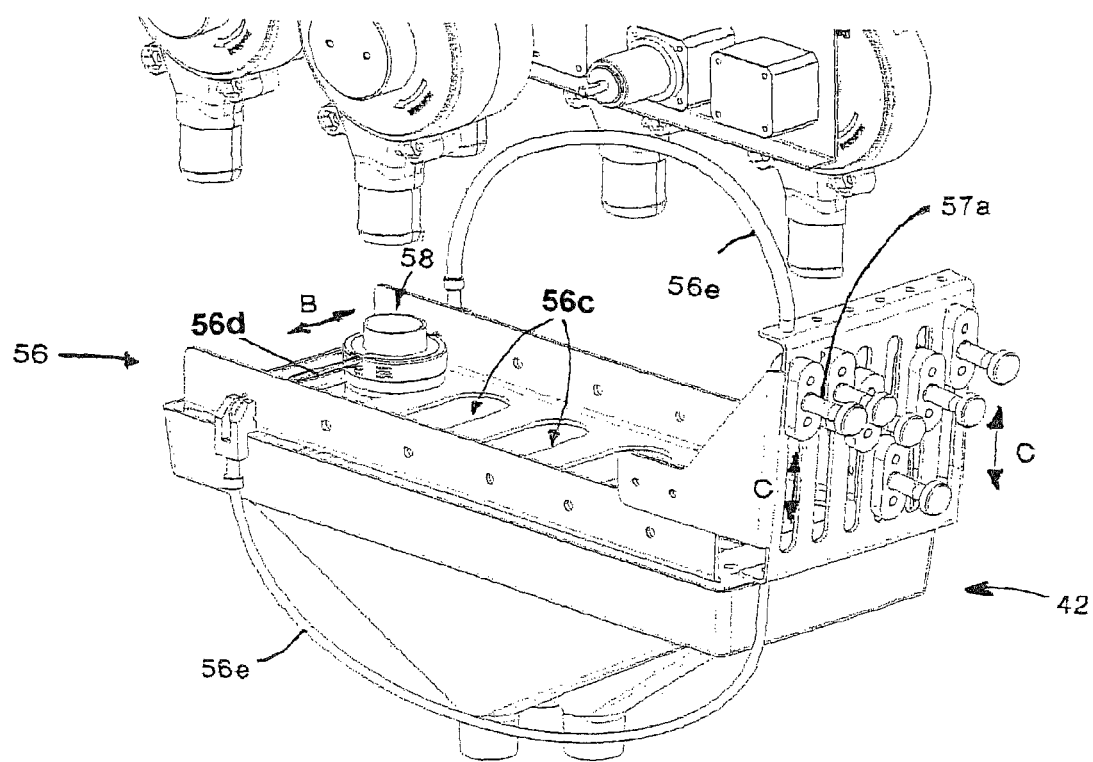
FIG. 7c is the view of FIG. 7b with the shown hose support actuated laterally across the corresponding mounting bracket slot.
Figure 7D:
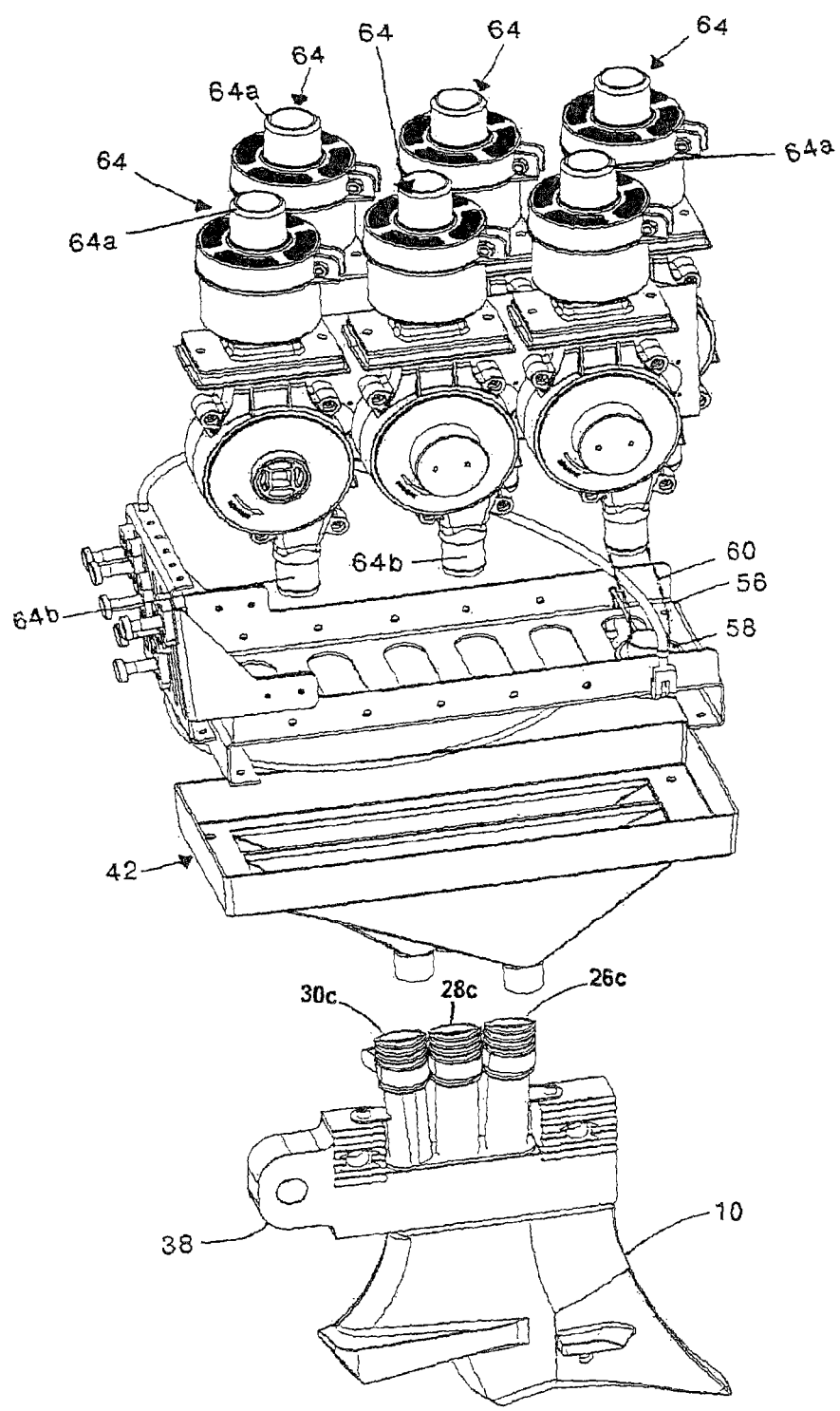
FIG. 7d is a further partially cut away view of the pod of FIG. 7 to show the metering assemblies, flow re-director, manifold, and opener.
Figure 7E:
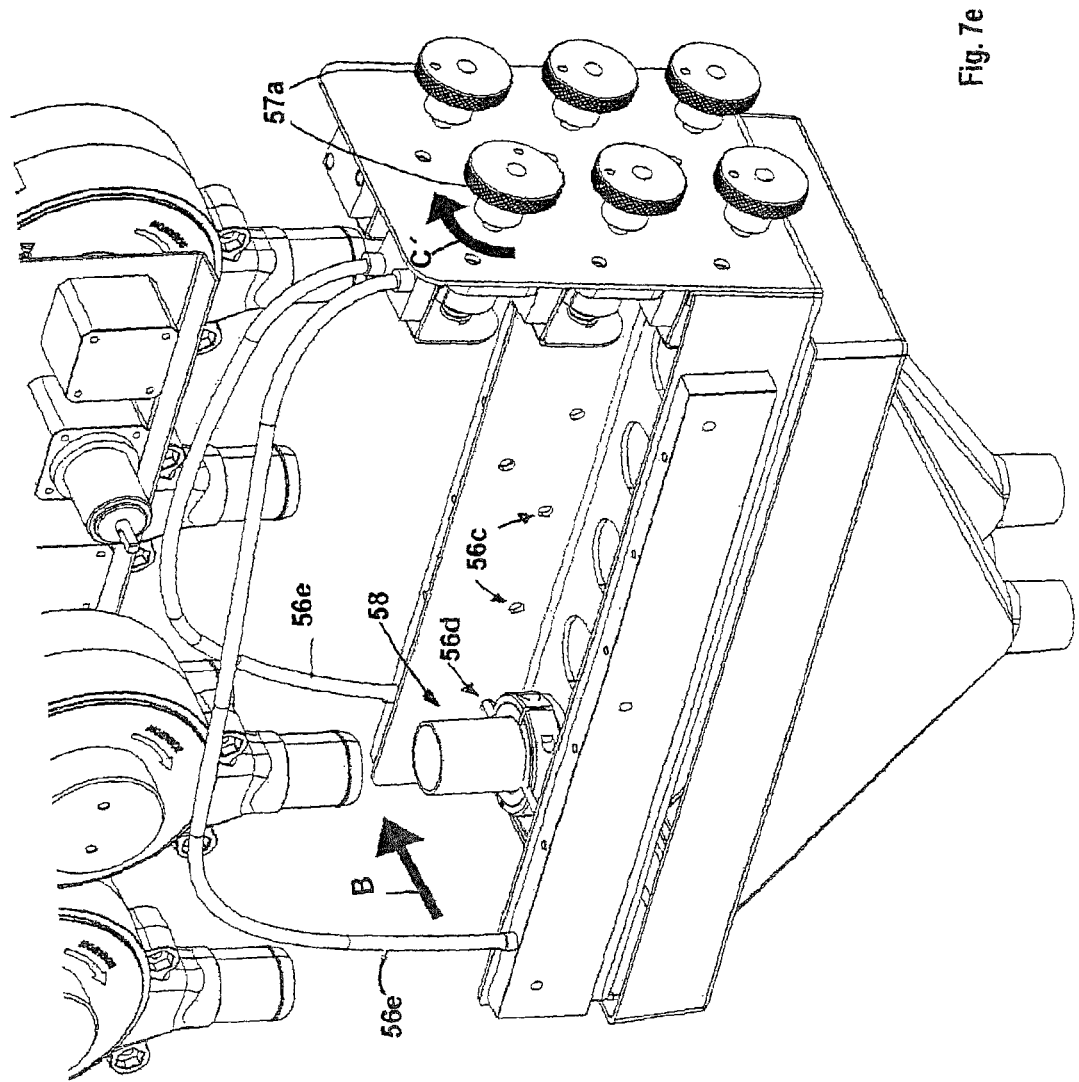
FIG. 7e is the view of FIG. 7b showing an alternative embodiment of the flow re-director actuators.
Figure 8:
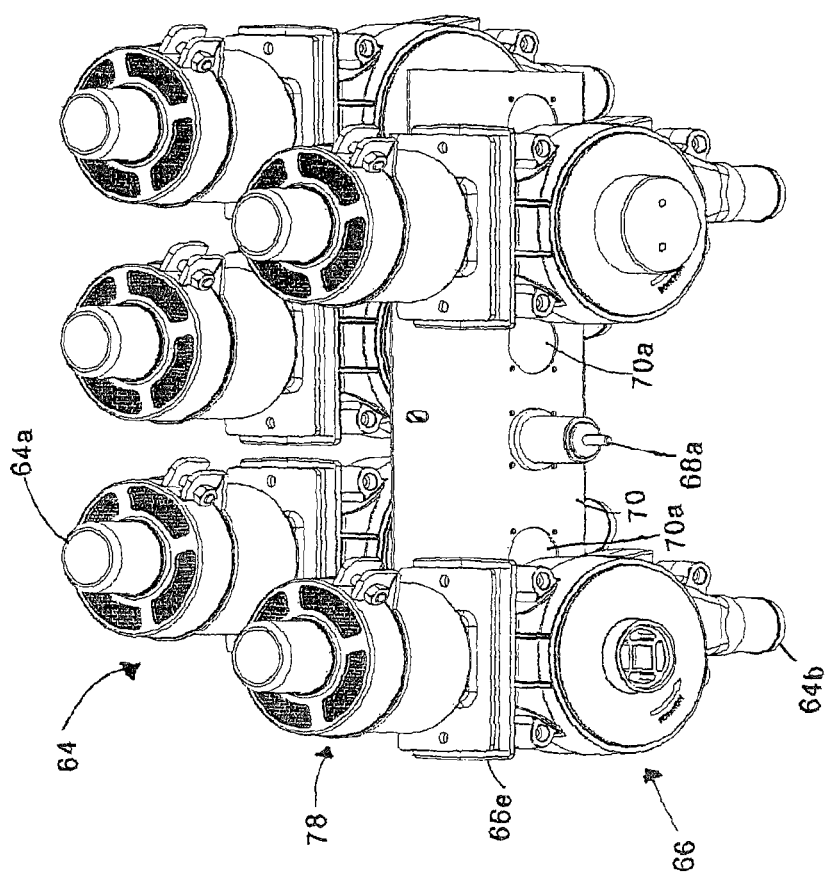
FIG. 8 is an enlarged further cut away view of the metering assemblies of FIG. 7b with two of the metering assemblies removed.

Each hose support 58 has an upper plate 58a and a lower plate 58b which sandwich therebetween the edges of a corresponding pair of adjacent cross members 56b. A series of six cable loops 56d within cable sleeves 56e, only one of which is shown in the two embodiments of FIGS. 7c and 7e, for selectively translating the six hose supports 58 in direction B, provide for individual positioning of hose supports 58 into their desired position laterally across their corresponding slots 56c. There is one cable loop 56d for each hose support 58. Each cable loop 56d is contained, so as to slide within, its own sleeve 56e which extends between hose position actuators 57 mounted on slide frame 59 and mounting bracket wall-mounts 61. Wall mounts 61 mount on opposite edges 56f of mounting bracket 56 and guide cables 56d through opposite pairs of apertures 56g aligned with each slot 56c. Cable loops 56d are each mounted to their corresponding hose support 58, so that as actuator handles 57a are, in the embodiment of FIG. 7c, slid in direction C along their corresponding slots 59a in slide frame 59, or are rotated in direction C' in the embodiment of FIG. 7e, hose supports 58 slide correspondingly along slots 56c. Thus by positioning, that is, by sliding or rotating actuator handles 57a a user such as a farmer may select the combination of which hose or hoses 60 is feeding product into which funnel 44, 46, or 48 in manifold 42. Thus a farmer may easily convert from one agricultural product (seed, fertilizer, etc.) combination to another agricultural product combination that, according to the crop yield optimizing field prescription, should be routed differently and/or so as to deliver in different quantities as between the outlet ports on the opener 10.

In one embodiment (not shown), which is not intended to be limiting, lower plates 58b are resiliently urged upwardly by springs (not shown) so as to be urged against the undersides of cross members 56b.

In a further embodiment, remotely controllable actuators (not shown) may be provided for the remotely controlled positioning of hose supports 58. The actuators may for example actuate hose supports 58 directly or may for example actuate cable loops 56d. The actuators may be controlled by programmable logic controllers governed by a main processor implementing the field prescription for a particular field.

Metering

Figure 9:
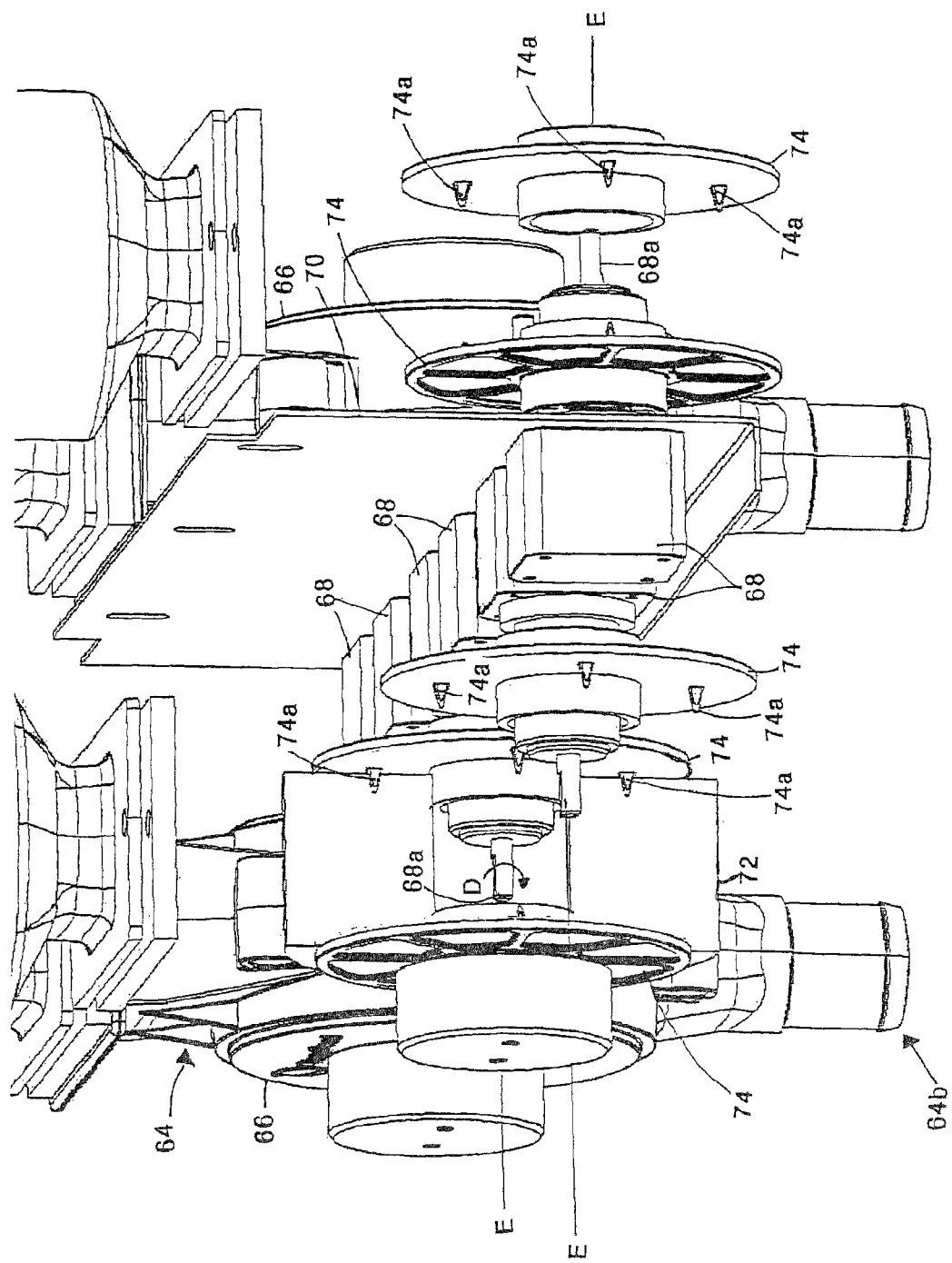
FIG. 9 is, in rear perspective, further cut-away enlarged view, the metering assemblies of FIG. 7d with three of the metering assembly cups removed and with the rollers removed or cut-away.

Six individual metering assemblies 64 are rigidly mounted, closely adjacent to one another, within metering housing 52. The use of six metering assemblies, fed from six local hoppers, and fed through six corresponding hoses into manifold 42, is given by way of example, as four or more metering assemblies/local hoppers/hoses into the manifold would also work. Again the objective is to try to match the number of prescription variables. Metering housing 52 may be separate from manifold housing 50, or may as illustrated be a single unitary housing. Each metering assembly 64 has its own corresponding inlet 64*a* and outlet 64*b*. The metering assemblies 64 are mounted in a staggered order along a centrally, vertically disposed mounting plate 70, better seen in FIG. 9, wherein two metering assemblies 64 have been removed and the view partially exploded so as to expose plate 70, and wherein the meter wheel cups or housings 66 are shown removed from three of the metering assemblies 64. Each metering assembly 64 includes its own stepper motor 68. Stepper motors 68 are mounted side-by-side along mounting plate 70. Because in the illustrated embodiment there are six metering assemblies 64, mounting plate 70 has a horizontal array of holes 70*a* corresponding to the six stepper motors 68. Stepper motor drive shafts 68*a* extend laterally from stepper motors 68, and alternately extend to starboard (right) and to port (left) relative to mounting plate 70. Stepper motors 68 may for example be manufactured by OSM Technology Company Ltd. (Part No. 17HS13-040S-PG19-C), located in Ningbo, China. The stepper motors 68 are Nema 17 frame size, each having a 28 millimeter, 19:1 planetary gearbox. Metering assemblies 64 are mounted in a left and right staggered array along mounting plate 70 within metering housing 52.

Rollers 72 (one of which shown partially cut-away in FIG. 9) may for example be polyurethane foam rollers. Rollers 72 are mounted sandwiched between disks 74. Rollers 72 are held in place by spikes 74*a* for simultaneous rotation in direction D about axes of rotation E on drive shafts 68*a*. Drive shafts 68*a* drive rotation of disks 74 and rollers 72 in direction D about axes E.

Figure 10:
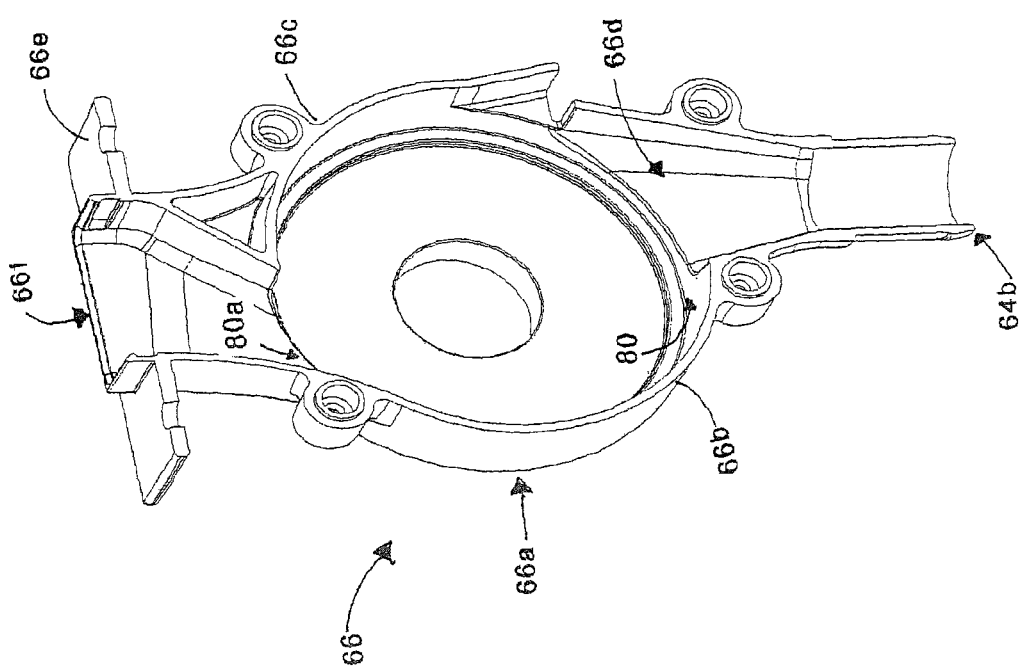
FIG. 10 is, in side-on perspective view, one half of a metering cup of one of the metering assemblies of FIG. 9.

Each pair of disks 74 and the roller 72 held clamped therebetween, is mounted within the roller cup 66*a* of meter wheel housing 66. One half of a meter wheel housing 66 is shown in FIG. 10. The other half of the meter wheel housing 66 is a mirror image thereof and is mounted thereto in opposed facing relation so as to enclose discs 74 and one roller 72 within roller cup 66*a*.

In jurisdictions allowing for incorporation by reference, U.S. Pat. No. 6,598,548 which issued Jul. 29, 2003, to Lempriere for a Seed Metering Device is incorporated herein by reference. U.S. Pat. No. 6,598,548 (the Lempriere '548 patent) describes a seed metering device which includes a roller nip for mounting beneath a seed reservoir. The nip is formed between a radially-outer surface of a soft resilient roller and a corresponding elongate, curved interior surface of a roller cup wall so as to form an elongate curved thin wedge-shaped, nip. The rotation of the roller by the roller drive, in the present embodiment provided by a stepper motor 68 and drive shaft 68*a*, draws granular agricultural product such as seeds down through and along the nip by the frictional engagement of the granular agricultural product in the nip with the surface of the resilient roller. The long, thin wedge-shaped nip between the roller and the cup wall of provides an increased dwell time for seeds being compressed in the nip to provide improved and more accurate singulation of the granular product being metered. A figure from the Lempriere '548 patent is reproduced herein as FIG. 11 so as to illustrate the geometry of the seed metering device used in the present metering device embodiment. The use of this form of metering device is not intended to be limiting as other accurate metering devices would also work as would be known to one skilled in the art.

Figure 11:
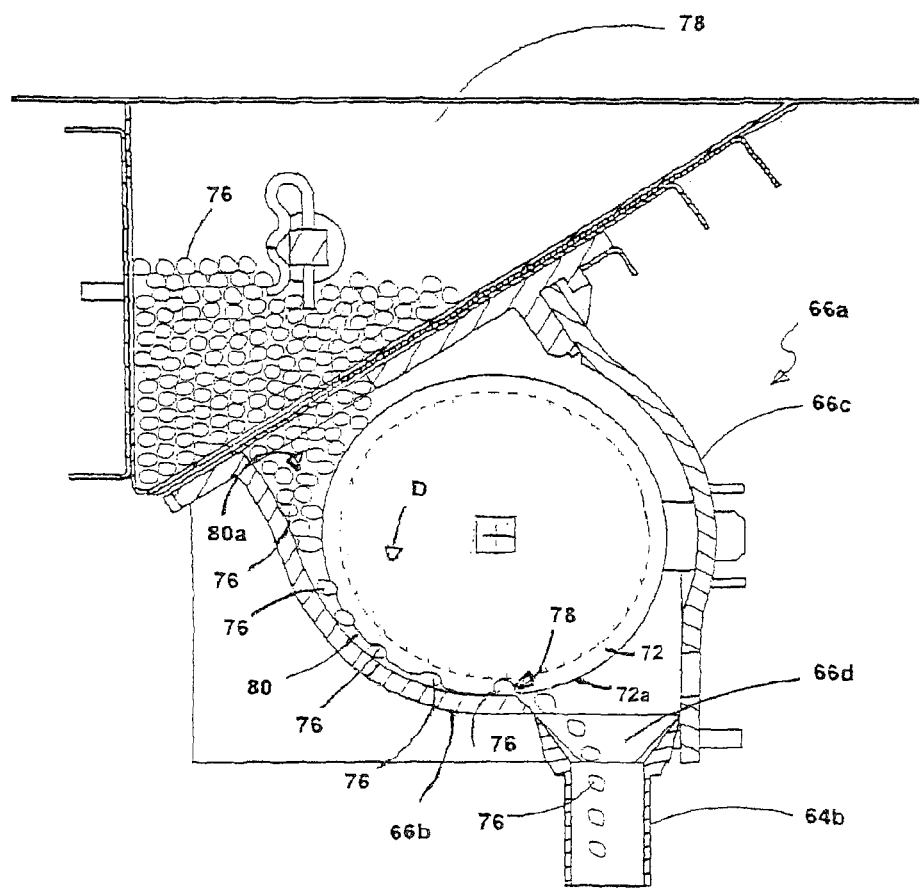
FIG. 11 is a sectional view through a prior art seed metering device.

As seen in FIG. 11, wherein the reference numerals used in the present specification have been transposed onto the prior art drawing from the Lempriere '548 patent, the roller cup 66*a* has a lower wall or rigid control surface 66*b* and a generally oppositely disposed upper wall 66*c*. Roller 72 may be soft resilient polyurethane foam, for example made from 40 pound, No. 3, expanded foam, although this not intended to be limiting. The exterior surface 72*a* of roller 72 may be smooth as illustrated or scalloped or otherwise textured. Granular agricultural product such as seeds 76, are held in a localized hopper 78, which in the illustrated embodiment as better described below are different in appearance to that shown in FIG. 11 but which serve the same purpose; namely to hold a small reservoir of granular agricultural product such as seed 76 directly above the opening 80*a* into the elongate, thin, wedge-shaped nip 80. The granulated agricultural product, having been singulated through nip 80, falls into shoot 66*d* so as to exit from outlet 64*b*.

Figure 12:
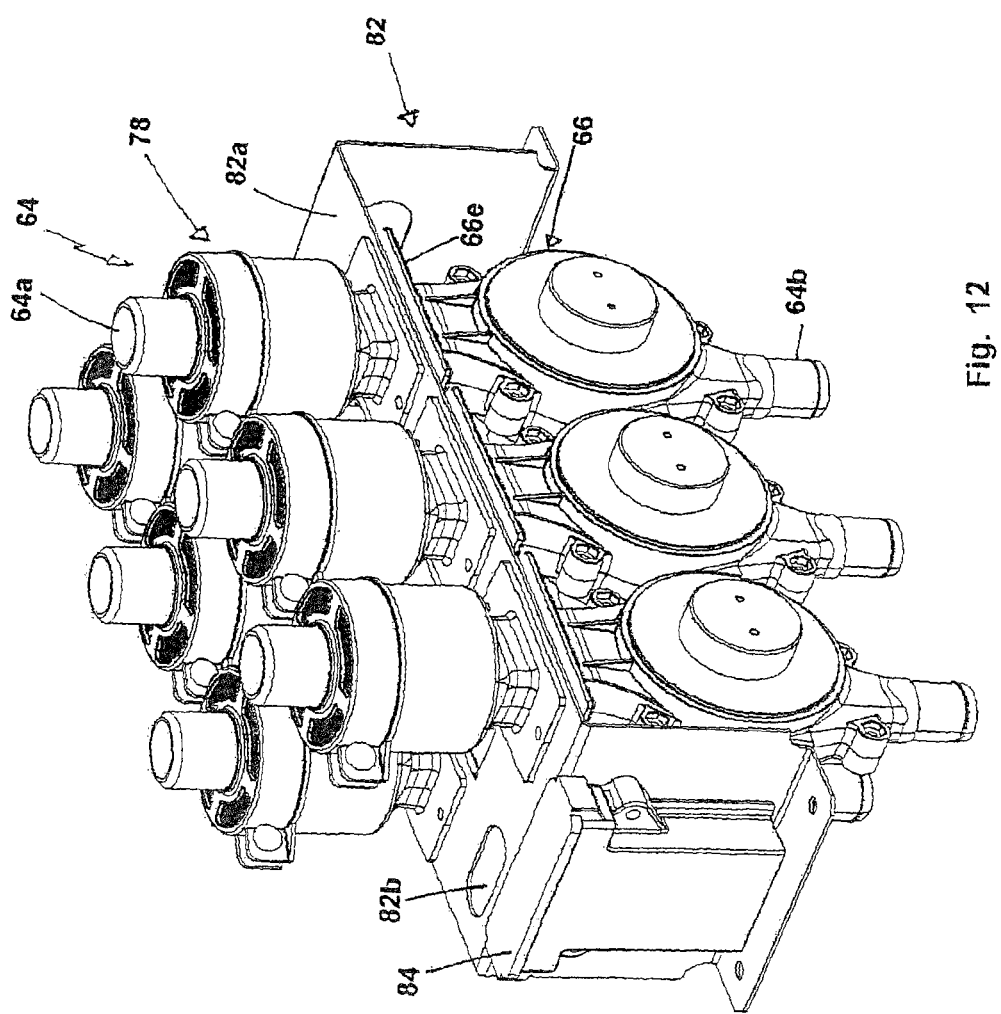
FIG. 12 is, in perspective view, six metering assemblies mounted on a mounting bracket which also supports the step motor controller for the metering assembly step motors.

As seen in FIG. 10, a planar upper shelf 66*e* provides a mounting surface for housing 66. As seen in FIG. 12, shelf 66*c* mounts to the top surface 82*a* of mounting bracket 82 on which are mounted local hoppers 78. The top surface 82*a* of mounting bracket 82 has apertures 82*b* which are aligned over the intake openings 66*f* of each meter wheel housing 66. That is, with a corresponding local hopper 78 mounted over aperture 82*b*, granulated agricultural product stored within hopper 78 falls through aperture 82*b* and into intake opening 66*f* so as to thereby feed into nip opening 80*a*. Thus as the corresponding stepper motor 68 rotates roller 72 in direction D according to its specific metering instruction received from the control system implementing the prescription for a particular field as described below, the granulated agricultural product stored locally in the corresponding local hopper 78 is drawn into and along nip 80 so as to be singulated and accurately metered through outlet 64*b*. The metered granulated agricultural product thus flows through the corresponding hose 60 and into the desired funnel 44, 46, or 48 of manifold 42 according to the configuration of the flow re-direction which positions the corresponding hose support 58 on mounting bracket 56. The granulated agricultural product then flows into opener 10 so as to exit from the desired opener outlet port.

Thus it will be readily understood by those skilled in the art that depending on the configuration of the flow re-directors, that is, in the illustrated embodiment the lateral placement of hose supports 58 for the six hoses 60 corresponding to the six metering assemblies 64, and depending on which granulated agricultural product is stored in a particular local hopper 78 (fed from a corresponding bulk storage compartment associated with the seed drill), a large variety of combinations of the agricultural products and in quantities that may be varied, may be supplied by combining certain agricultural products in more than one local hopper for simultaneous feeding into a desired port in opener 10. Thus the operator and/or processor (for example in the embodiment providing remote actuation of the flow re-director) may vary flow rates, concentrations, combination, and quantities of agricultural products for any one of the three outlet ports 26*a*, 28*a*, or 30*a* on opener 10 so as to best meet the field prescription.

Figure 13:
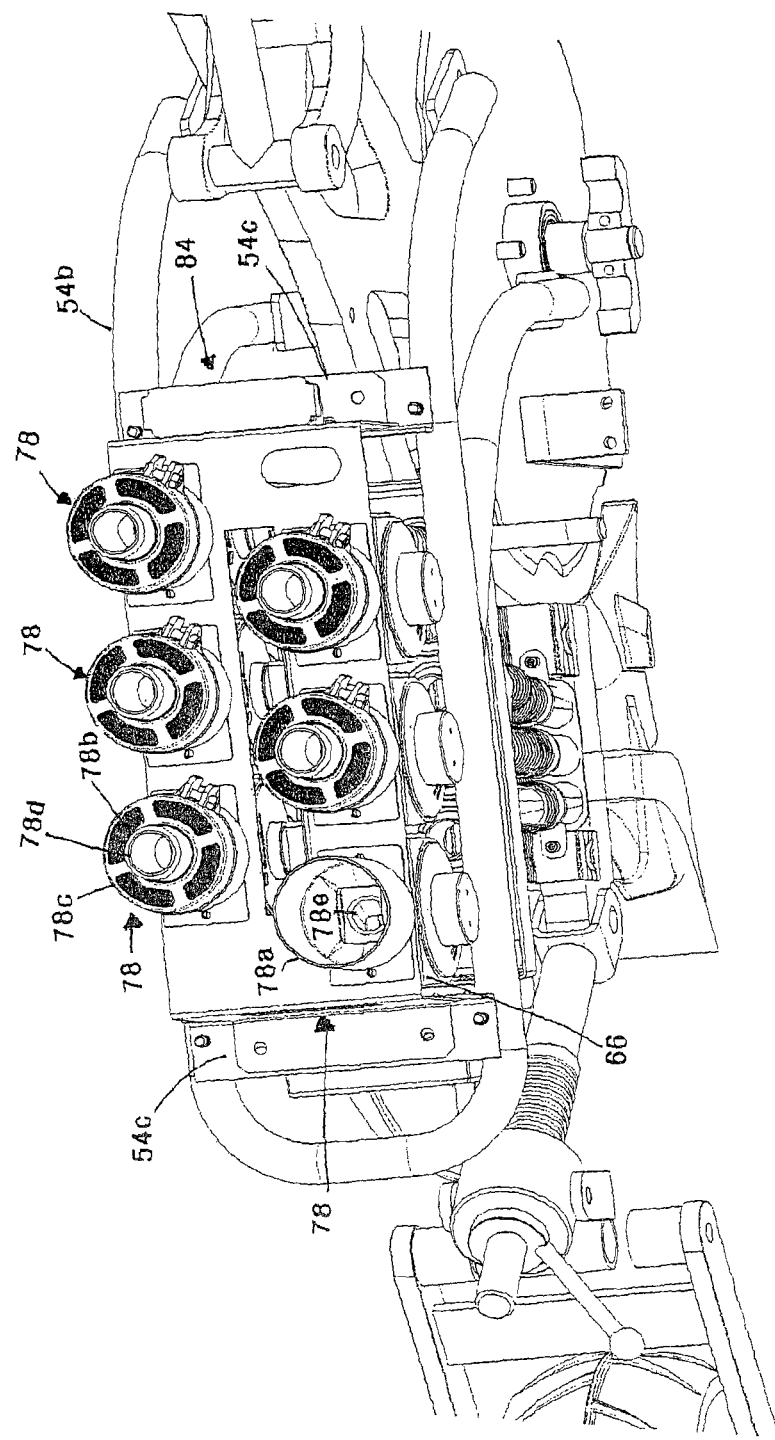
FIG. 13 is the pod of FIG. 5 from an upper perspective view looking down into the localized hoppers on each metering assembly, with one localized hopper partially cut away.

As seen in the partially cut away view of FIG. 13, each local hopper 78 includes a lower cup 78*a*, a screen 78*b* which overlies the upper opening into cup 78*a*, and upper cup 78*c* which secures screen 78*b* onto lower cup 78*a*. A cylindrical spigot 78*d* is supported vertically and centrally in lower cup 78*a* by upper cup 78*c*. An aperture 78*e* in the lower surface of lower cup 78*a* aligns over both aperture 82*b* in mounting bracket 82 and intake 66*f* of the corresponding metering wheel housing 66.

Mounting bracket 82 and controller 84, which controls the operation of stepper motors 68, are mounted on cross members 54*c* on frame arm 54*b*.

Hypothetical Example

In a hypothetical example which is provided without intending to be limiting, the opener has three conduits, there are six metering devices in a pod, and there are six corresponding bulk storage compartments, of which two of the bulk storage compartments are feeding two different types of seeds to the local hoppers for two of the metering devices, a third bulk storage compartment has a herbicide for the third metering device, and the remaining three bulk storage compartments have the components which together make up the desired fertilizer, for example, Nitrogen (N) in one, Phosphorus (P) in another, and Potassium (K) in the last for feeding the fourth, fifth and sixth metering devices respectively.

For a particular area of the field, in this example the field prescription calls for 70-30-30 (N, P, K) kg/ha, which means a fertilizer delivery rate from a particular pod equivalent to delivering 0.428 kgs of 46-0-0- from the fourth metering device (N), 0.173 kgs of 11-52-0-0 from the fifth metering device (P), and 0.145 of 0-0-62 from the sixth metering device (K) to create the blend called for by the prescription for that location on the field. In this example if the prescription is constant for 100 m of travel for that pod, and the seeding drill is travelling at 8 km/hr, then, given densities of 0.785 gm/cc (N) and 0.945 gm/cc (P and K), the fourth, fifth and sixth metering devices would deliver at approximately 12 cc/s, 4 cc/s, and 3.4 cc/s respectively.

The N, P, K metering devices feed the fertilizer conduit in the opener, i.e. feed the one opener conduit assigned to fertilizer delivery out of the available three opener conduits. The three corresponding stepper motors would be driven to deliver the 12 cc/s, 4 ccs and 3.4 cc/s flow rates of N, P, and K. The flow re-director would be configured so that the three metering devices metering the fertilizer components blend and feed the fertilizer components into the one assigned conduit in the opener so as to achieve the prescribed 70-30-30 kgba delivering density for that location. Thus it will be appreciated how the required accuracy of delivery density may be achieved, using the desired blending, and varied over the field on-the-fly to meet the delivery resolution called for by the field prescription.

As the fertilizer prescription changes over the field or over the length of the drill arms for any particular field location, the flow rates are adjusted by altering the motor speed to provide other called for concentrations of N, P and K.

If it is desired that the herbicide also be delivered through the assigned fertilizer opener conduit, then the flow re-director is reconfigured to direct the flow from the metering device regulating the flow of herbicide into the opener conduit assigned to the fertilizer.

Seeding may be applied in a density according to the prescription by configuring the flow re-director to direct the regulated flow(s) of seeds through the second opener conduit. In this example, water may then be channelled through the third opener conduit. To accomplish the full adjustability of re-directing each of the metering devices to each of the opener conduits, that is, the ability to match any one or more of the bulk storage compartments and corresponding metering devices with any one of the opener conduits, each of the metering devices must be adjustable so as to deliver its agricultural product to any one of the three opener conduits. The available mapping permutations are set out in the Metering Device-to-Opener Conduit (or Opener Outlet) Mapping Chart of FIG. 24. Two embodiments to accomplish the necessary flow re-direction are illustrated in the Figures.

Although not intended to be limiting, in the illustrated embodiment each opener conduit has a corresponding manifold funnel having an elongate upper opening into the funnel. The upper opening of each funnel may be described as elongate in a first direction. The three elongate openings of the three funnels corresponding to the three opener conduits are positioned side-by-side so that their three elongate openings are parallel and closely adjacent to one another.

Each metering assembly meters agricultural product from its corresponding bulk storage compartment into a flexible hose downstream of the corresponding metering device. The free end, i.e. the downstream end of the hose is positioned in one of three positions over one of three funnel openings. The positioning of the free end of the hose may be described as positioning in a second direction. Thus in the illustrated examples, the first and second directions are substantially perpendicular to one another and lie generally in horizontal planes.

The six hoses from the six metering devices are mounted over the length of the side-by-side funnel openings so that the free end of each of the hoses may be positioned, independently of the other hoses, over any one of the three funnel openings. This is done by having the hoses mounted over the funnel openings with the free ends of the hoses moving parallel to one another so as to translate laterally, i.e., in the second direction, over the three funnel openings. The free ends may be positioned manually by the user, for example when setting up the required configuration to meet a particular prescription, or the free ends of the hoses may be positioned using actuators, which may be remotely controlled, and in one embodiment (not shown) may be controlled by a programmable logic controller or other processor, for example in accordance with instructions from the system main controller. Two types of actuators for positioning of the free ends of the hoses are illustrated, which are not intended to be limiting.

One skilled in the art will recognize that the out-flow from each metering device may be directed into any one of the opener conduits by a variety of methods, for example within a manifold, and/or for example by means of controlled gates and/or flumes, or the use of rigid, pivoting chutes or other flow re-directors for switching independently all of the metering device outflows between any one of the opener conduits at the upper end of the opener.

Carriage Frame

Depth control actuator 86 is pivotally mounted at its lower end to car 38, and is pivotally mounted at its upper end to the wheel support frame 88 for the terrain following wheel 90. Although actuator 86 as illustrated is shown as being a manually operable, one skilled in the art will appreciate that a remotely controlled actuator for example hydraulic, electric, pneumatic, or other actuator may be employed. Thus if depth control actuator 86 is for example a hydraulic actuator, the control system which regulates the compliance of the metering of granulated agricultural product according to the field prescription, may also automatically regulate the depth of opener 10 and thereby the depth of seeding or fertilizer placement in a particular area of the field to which the prescription applies.

As better seen in FIGS. 3 and 4, tool bar clamp 92, which mounts to the tool bar of the seeding drill 108 (see FIG. 14), provides a rigid support for upper and lower pairs of parallelogram arms 94a and 94b respectively which are pivotally mounted to tool bar clamp 92. Arms 94a and 94b support raising and lowering of the pair of laterally spaced part frame members 96, so that frame members 96 remain at a constant orientation relative to the horizontal as they are raised or lowered.

A pair of laterally spaced part disk cleaning blades 98 are mounted so as to depend downwardly from frame members 96, and so as to be snugly adjacent opposite sides of disk 100. Disk 100 is rotatably mounted between frame members 96 and blades 98. Blades 98 extend vertically downwardly so that their lower-most ends are adjacent the perimeter of disk 100 and just forward of toe 32 on opener 10.

Rearwardly extending swing arms 102 are pivotally mounted to frame members 96 and to the upper end of depth control actuator 86 so that actuation of depth control actuator 86 raises and lowers the aft end of swing arms 102. A pair of inwardly inclined closing wheels 104 are mounted on opposite sides of swing arms 102 so as to depend downwardly therefrom. Closing wheels 104 close the furrow in the ground formed behind opener 10. Wheel support frame 88 is mounted to the rear-most end of swing arms 102 and supports ground engaging wheel 90.

Prescription Controlled Distribution

Figure 14:
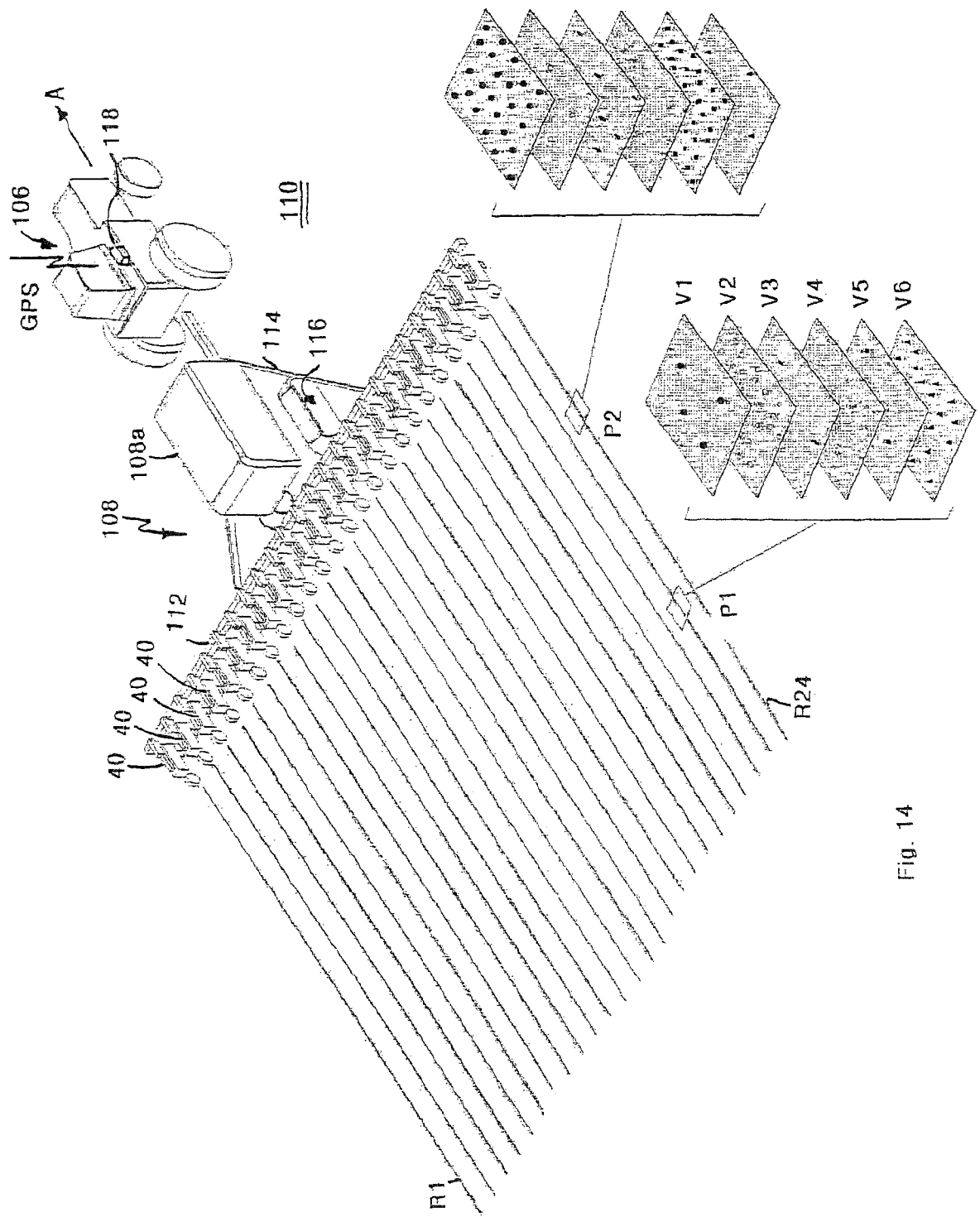
FIG. 14 is in rear perspective view, a drill carrying a laterally spaced array of pods being towed by a tractor over a field.

As seen in FIG. 14, a prime mover such as tractor 106 propels seed drill 108 forwardly in direction A over field 110. Field 110 is the subject of a soil characteristic analysis and corresponding mapping such as conducted by commercially available field prescriptions service providers. One such service provider is Phantom Ag Ltd. doing business as CropPro Consulting, located in Naicaim, Saskatchewan, Canada. CropPro Consulting offers a variety of service packages so as to produce a variety of maps including prescription maps, zone maps, biomass maps, drainage maps and the like, all of which are collectively referred to herein as field prescriptions and which may be loaded into a computer as a prescription file. The combined prescription file data and service provider application software is run in a computer which for example may be computer 118 situated within tractor 106 or for example may be located in a vehicle towed by the prime mover, such as within trailer 108a, which may or may not form part of drill 108. The prescription software provides input to a programmable control system which regulates the variable rate dispensing of agricultural products from metering assemblies 64, that is, as individually metered by each of the multiplicity of metering assemblies 64 within each pod 40 mounted in laterally spaced, high resolution array across the tool bar 112 of drill 108. In the embodiment illustrated, 24 pods 40 are equally spaced apart along the transversely aligned tool bar 112 being towed on drill frame 114. Drill 108 is adapted for towable translation over field 110, for example on wheels or tracks 116.

In the illustrated embodiment, which is not intended to be limiting, the density of the lateral spacing of pods 40 is governed by the laterally widest component of each pod 40, which presently is the pair of closing wheels 104 which limit the spacing between adjacent openers 10 to the order of 1-2 feet. As one skilled in the art will appreciate, if the soil mapping resolution provided by the field prescription service provider is in the order of 1 or 2 feet per data point, then the presently provided opener resolution of 1-2 feet between openers 10 is sufficient to allow the control system to replicate the field prescription file in the actually applied prescription.

Thus as mentioned above, although in the illustrated embodiment six metering assemblies 64 are provided per pod 40, the invention is not so limited. For example four or more will also work. The use of six metering assemblies per pod 40 is particularly useful where there are six prescription variables (illustrated as V1-V6 in FIG. 14) in the field prescription. The prescription variables may include the seed type being planted (a second variable being a second seed type being planted if the prescription calls for intercropping), and up to five other crop inputs to use the language of McQuinn (from his U.S. Pat. No. 6,122,581), and thus may include liquid and/or granulated agricultural products such as fertilizer, herbicides, insecticides, where for example in the case of fertilizer, the crop inputs may include differing fertilizer formulations of Nitrogen, Sulphur, and Phosphate levels.

Six layer surfaces are shown diagrammatically in FIG. 14 for two different field location points P1 and P2 to indicate the quantity/density of a particular prescription variable (V1-V6) as called for by the field prescription for that particular field location. Thus, in operation, computer 118 receives GPS location data so as to constantly monitor the position of each opener 10 in each pod 40. Those positions are compared to the corresponding or upcoming data points in each particular row (in the illustrated embodiment rows R1-R24) so as to adjust in real-time the flow rate or applied density of agricultural product according to the quantity called for, for each variable V1-V6 for each pod 40 at each data point along each corresponding row R1-R24.

Thus if the data point resolution provided for field 110 by the prescription file being utilized by computer 118, and in particular by the main controller providing instructions to each controller 84 associated with each pod 40 for the required metering rate regulation of each associated metering assembly 64, is for example a data point resolution of every 1-2 feet then for a given forward velocity in direction A (for example in the range of 3 to 8 mph) and for a given delay time due to processing time between computing the next variable set for each pod 40 in anticipation for an upcoming set of known locations for each opener 10, and the delay associated with implementing the actual in-ground application of the agricultural products through each metering assembly 64, the speed of tractor 106 may have to be regulated so as to not affect the accuracy of the control system implementing the prescription via metering assemblies 64 and so as to provide a resolution matching that called for by the prescription file. For a given delay due to processing of GPS information and processing by the prescription algorithm of the next called for prescription variables across each of the pods 40 and depending on the resolution called for in the prescription file, the resolution may be increased subject to machine constrains in the lateral width of each pod 40. As the physical lateral width of each pod 40 is reduced, the spacing between the rows will be reduced. Reducing the forward velocity of tractor 106 will allow for accurate metering by metering assembly 64 to replicate the prescription in a higher resolution in direction A along the rows. Consequently it will be understood by those skilled in the art that the present invention is not limited to the illustrated embodiment or any particular prescription resolution, as the resolution may be increased as the various machine constraints and the data processing, signalling and implementation times are reduced. This will allow for increased forward velocity.

The present invention is also not intended to be limited to the illustrated level of automation. As discussed above, the depth control actuator may be automated so that the control system may actuate actuator 86 to set opener depth and to adjust opener depth on-the-fly if the prescription file calls for it. Also, it may be that automated actuators may be applied to the flow re-director for each pod, for example in the illustrated embodiment to position hose supports 58 in their lateral positioning across slots 56*c* on mounting bracket 56 so as to allow the controller system to align hoses 60 with desired manifold funnels 44, 46, 48 feeding corresponding ports 26*a*, 28*a*, 30*a* in the opener 10. The illustrated embodiment is not intended to be limiting as manifold 42 may have more than three funnels so as to correspond to more than three conduits in the opener, and hose supports 58 will be positionable over all such openings and funnels. Thus particular agricultural products in any one of the six local hoppers 78 for a particular pod 40 may be entirely shut off for a period of time, or may have the flow rate reduced or increased for a particular period of time depending on what is called for by the prescription file. Also, one or more of the opener ports may be fed by one or more of the six metering assemblies 64 depending on the position of the corresponding hose supports 58.

Although in respect of the illustrated embodiment there has been only reference to the use of liquid or granular agricultural products, it may be that in certain applications, in particular in vary arid conditions, that one of the opener ports may be usefully employed to supply water simultaneously with the other ports supplying the agricultural product called for by the prescription. In fact the prescription may call for regulated amounts of water. It may also be the case that in certain situations openers having more or less ports may be used, in which case appropriate openers may be substituted for what is illustrated as the Mark VII opener.

Because of the relatively small size of localized hoppers 78, hoppers 78 may be either kept continuously or sufficiently full by the use of an air-seeder feed arrangement, meaning the granular agricultural product is blown from a centralized location such as from corresponding bulk bins or bulk storage compartments within trailer 108*a*. A centralized air-feeder system is just one example of how localized hoppers 78 may be provided with a sufficient and readily available supply of the agricultural product selected for application by the corresponding metering assembly 64, as other centralized distribution systems may also work for distributing the agricultural product from the bulk bins in the central storage location such as in trailer 108*a*. Thus if an air-feeder is employed, a multitude of supply lines (not shown) would provide the various agricultural products blown in to each localized hopper 78 in each pod 40. This is to avoid any one hopper 78 being emptied. An unintentionally emptied hopper 78 potentially introduces an inaccuracy into the replication of the prescription file until such time as that hopper 78 is re-filled.

Figure 15:
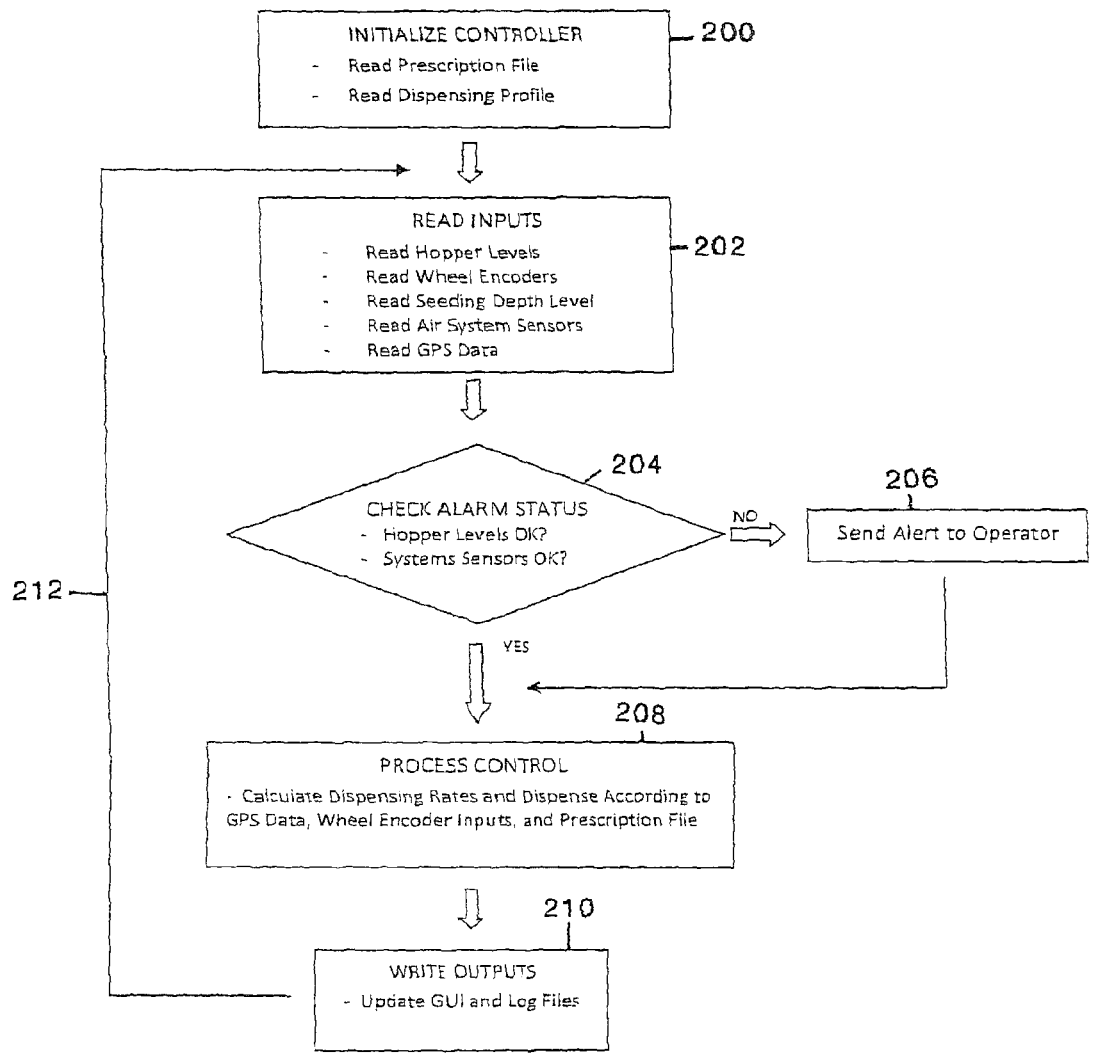
FIG. 15 is a high level logic flow chart of the control logic of the drill control system.

FIG. 15 is a diagrammatic representation of the controller logic. At step 200 the controller, whether it is computer 118 or within another processor, or whether or not the processing is of a centralized or distributed architecture, is initialized so as to read the prescription file and to read the dispensing profile. The prescription profile is determined so as to implement the prescription file within machine limitations. At step 202 the inputs are read so as to input for example the hopper levels, the position of the wheel encoders (or the input from other velocity measuring devices), the seeding depth level, the air system sensors (assuming that the centralized distribution of the agricultural product to each hopper 78 is via an air feeder) and the GPS location data.

In step 204 if the sensors (not shown) in either localized hoppers 78 or within the bins in trailer 108*a* indicate a low level then an alert is sent to the operator (step 206). Otherwise, if the hopper and bin levels are within pre-set tolerable limits, and if the system sensors (not shown) also indicate that the systems are functioning, then the control system proceeds to step 208. In step 208 the dispensing rates for each of the metering assemblies 64 in each of the pods 40 are determined so as to dispense agricultural product according to the GPS location data, the velocity inputs such as from the wheel encoder, and the prescription file. The corresponding instructions are sent to each controller 84 so that each controller 84 may send the corresponding pulse signals to the stepper motors, accounting for velocity data for example from wheel encoders and the data from the prescription file in order apply seeds and fertilizer with accuracy and with a resolution on the field attempting to match the prescription file as closely as possible. Feedback is provided to the user via the graphical user interface (GUI) and recorded in log files in step 210. The process iterates in loop 212 at a refresh rate determined at least in part by data processing and signalling speeds, and machine constraints.

The pod controller 84 maybe a microprocessor based device to manage stepper motors 68 and be identified by the main controller in computer 118 according to its position on the drill. The position of each pod 40 on the drill is used to determine stepper motor speeds for tarn compensation or in the event of detected over-lap. A wiring harness may be used for power and signal interconnection of pods 40 to the main controller and power bus (not shown) The main controller uses data input from the user to send speed commands to pods 40 and send back error information to the GUI, alerting the operator of potential motor malfunction, low hopper levels, etcetera. A GUI display panel (not shown) is used to input user data and display system operation information to the user. The pod controller software performs the calculations to ensure correct feed ratios are met pursuant to the prescription file. The main controller software manages the communication of operational data to the individual pods 40 according to the position of the pods 40 on drill 108. The GUI software may graphically represent the tasks being carried out by the main controller and pod controllers. The GUI provides feedback to the operator as well as a means to accept input from the user, for example for feed ratio parameters. The GUI may show numerical feedback of parameters such as instantaneous feed ratios and machine wheel speeds.

Figure 16:
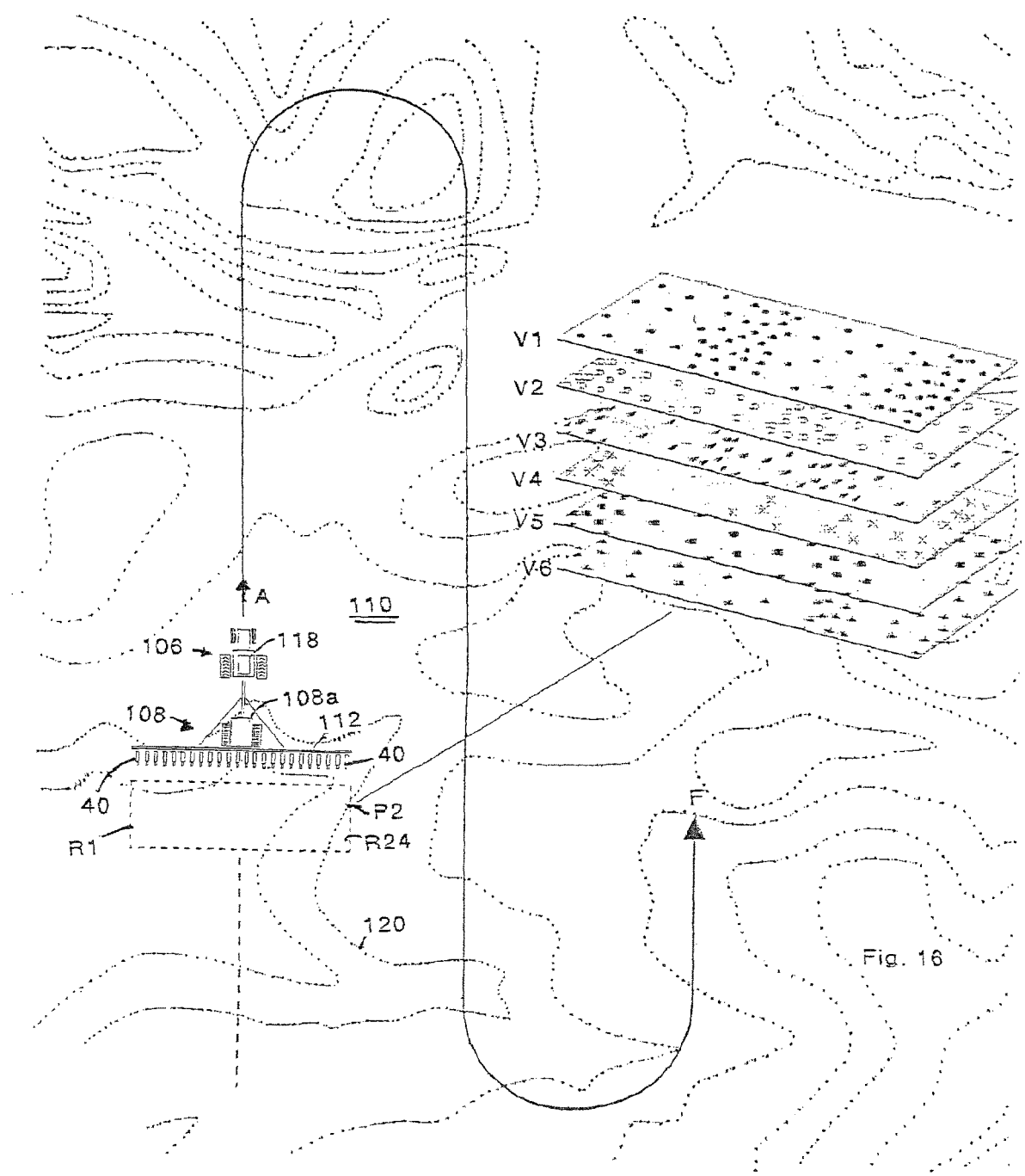
FIG. 16 is, in plan view, the drill and tractor of FIG. 14 traversing a field and showing contour field characteristic lines for the field.

Thus as seen in the seeding and fertilizing operation of FIG. 16, the prescription file being implemented by the main system controller in computer 118 contained either within the prime mover, such as tractor 106, or within the drill 108, in combination with the velocity data and the location data, and including compensation for the turns along field path F and for any overlap as path F attempts to provide complete coverage of field 110, results in dispensing of granular agricultural product with six variables V1-V6 (corresponding to the six metering assemblies 64 per pod 40). The number of variables (V) would increase if more metering assemblies 64 per pod 40 were employed. The use of six variables enables replicating the field prescription with accuracy and with a resolution only limited by data processing constraints and machine constraints such as spacing of the pods 40 on the drill tool bar 112. The soil characteristics represented in the corresponding prescription maps are illustrated by way of example using contour lines 102 which may represent levels of one or more of such ground characteristics as nutrient level, moisture content, soil depth, soil temperature, soil pH, soil porosity, soil salinity, ground elevation, and other soil characteristics as would be known to one skilled in the art.

Thus depending on which agricultural product is being fed from the bulk bins or bulk storage compartments, for example contained within trailer 108a, to the individual localized hoppers 78, the dispensing rates per metering assembly 64 are adjusted to accomplish the desired density of product at a particular ground data point.

On-the-Fly Bulk Bin Resupply

As mentioned above, one aspect of the present invention is not only improving yield by improving the flexibility, accuracy and resolution of applying a complex field prescription to a field using the drill system described above, but also improving the efficiency with which agricultural products are applied to implement the field prescription. Thus it will be appreciated that, even though the agricultural product which is finely metered through individually metering assemblies 64 and accurately dispensed at the desired data points on the field and at the desired soil depth by each opener 10 associated with each pod 40, over a large field area significant volumes of agricultural product may be used. Conventionally, the filling of hoppers and bulk bins on seed drills causes down time as the seed drill is brought to a halt as the hoppers or bulk bins are filled from a delivery vehicle. Consequently in order to minimize down time, in a further aspect of the present invention, convertible road-to-field nurse trailers 122 are employed.

Figure 17:
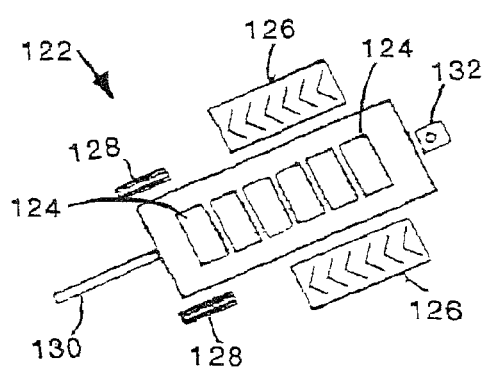
FIG. 17 is, in plan view, a convertible road-t-field nurse trailer.
Figure 18:
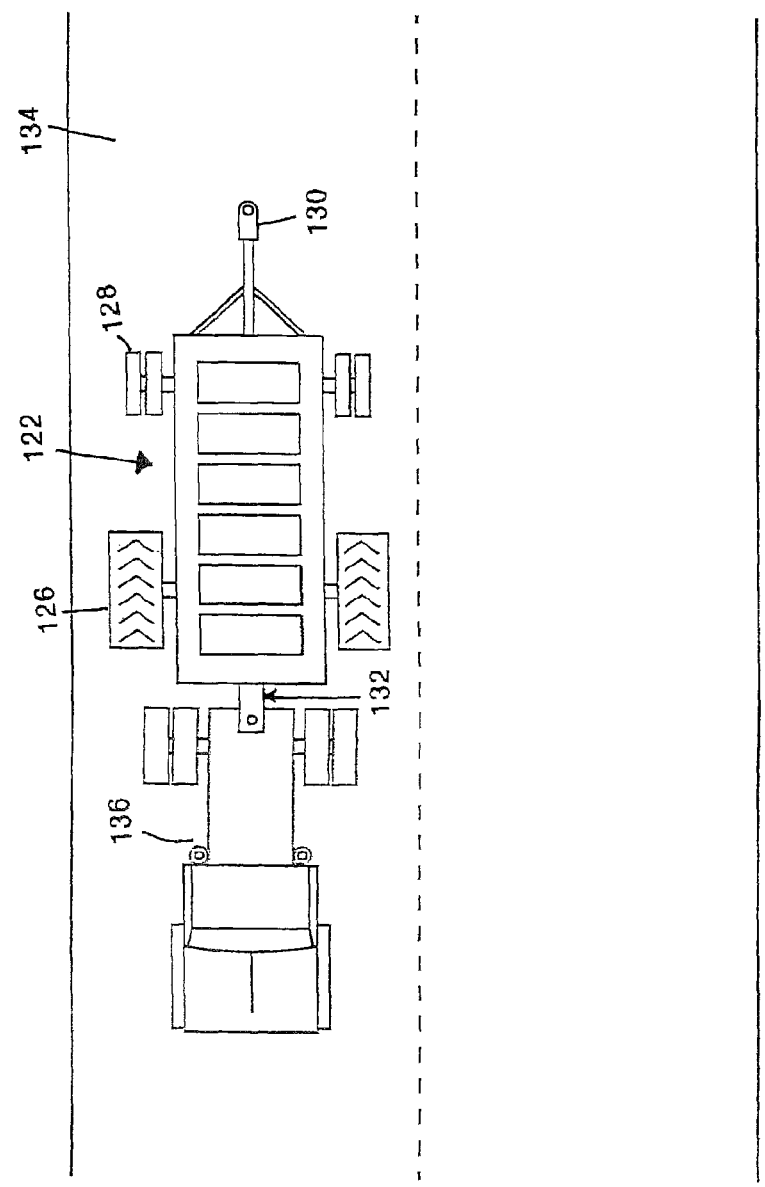
FIG. 18 is, in plan view, the trailer of FIG. 17 being towed by a truck.
Figure 19:
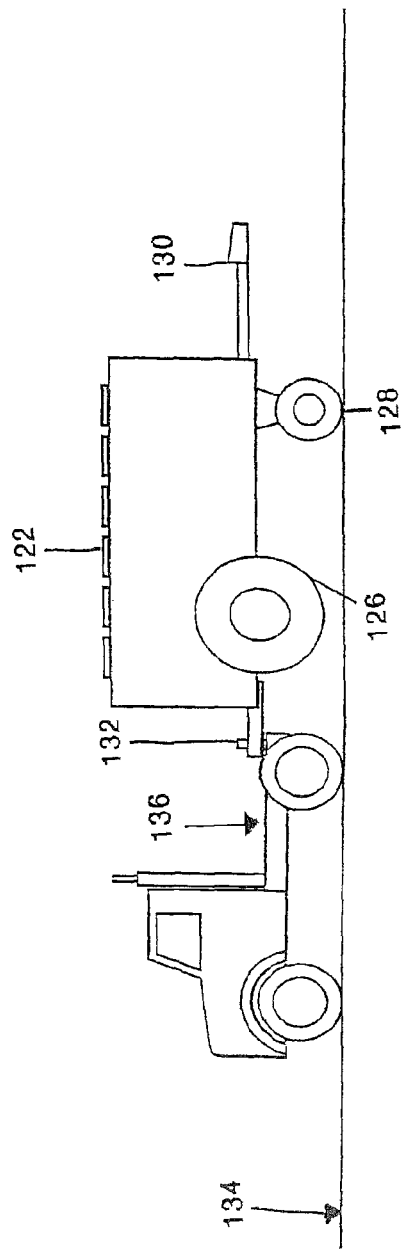
FIG. 19 is, in side elevation view, the truck and trailer of FIG. 18.
Figure 20:
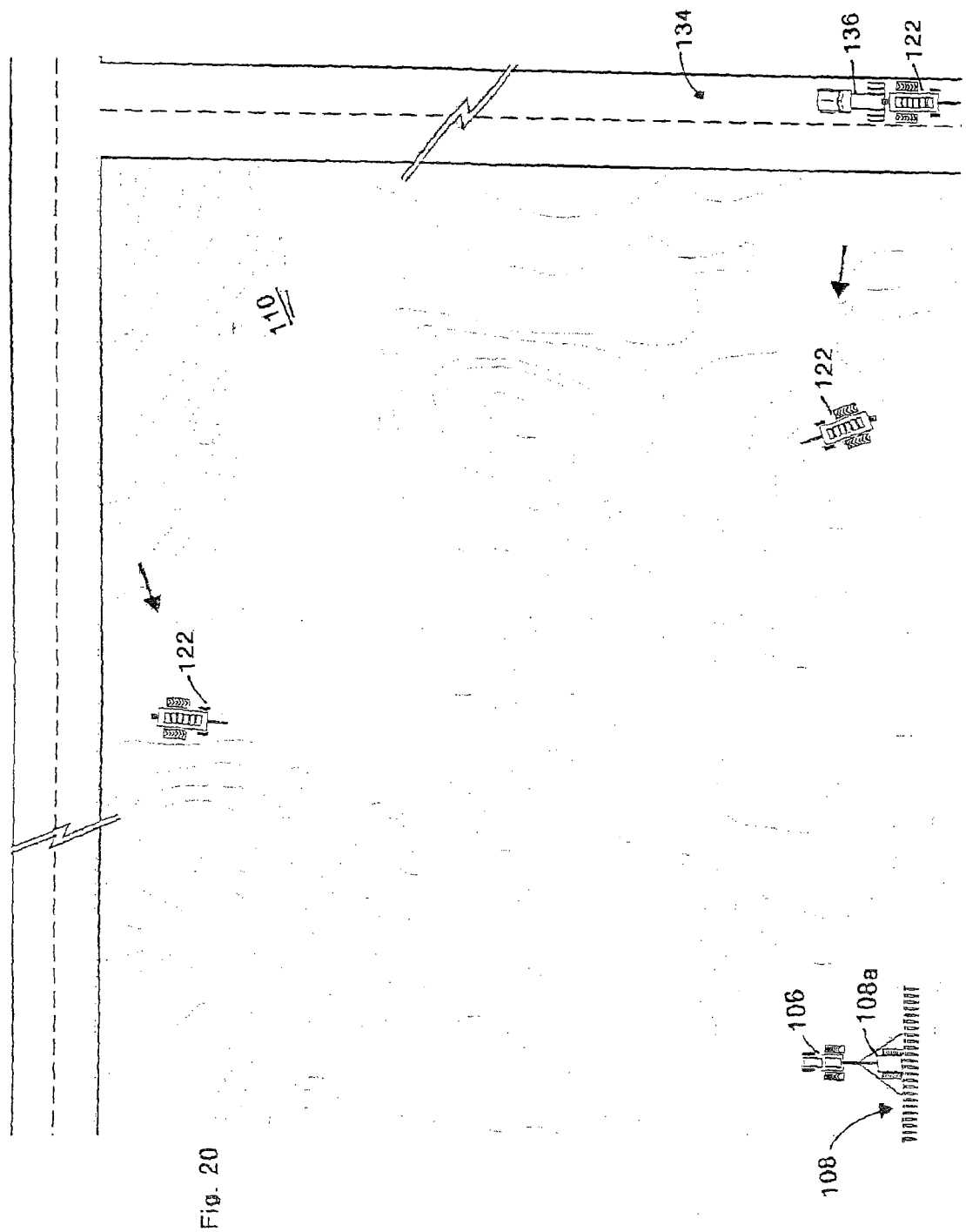
FIG. 20 is, in plan view, the tractor and drill of FIG. 16 shown commencing seeding and fertilizing operations on a field whereon two of the trailers of FIG. 17 are pre-positioned.

In one embodiment not intended to being limiting, as seen in FIG. 17, convertible trailer 122 holds a series of six bins 124 in which six different agricultural products may be stored and transported. The number of bins 124 corresponds to the number of local hoppers 78 per pod 40. Field-size floatation wheels 126 are mounted on one end of the trailer, which may in alternative embodiments, be tracks or the like adapted for use on field terrain. On the opposite end of the trailer are mounted road wheels 128. A draw bar 130 extends from the road wheel end of the trailer. A hitch 132 is mounted at the opposite end of the trailer, i.e., at the end of the trailer on which the field wheels are mounted. As seen in FIG. 18, convertible trailer 122 may be towed on roadway 134 by a road-legal truck 136 by mounting hitch 132 to, for example, a fifth-wheel hitch on truck 136. As will be appreciated by a review of FIG. 19, trailer 122 is towed from one end of the trailer for highway use, and from the other end of the trailer for field use. Thus the road use hitch 132 is on the opposite end of trailer 122 from the field use draw bar 130. Draw bar 130 is at an elevation which engages flotation field wheels 126 onto the field, and hitch 132 is at an elevation which engages road wheels 128 onto roadway 134. Once drawbar 130 is hooked-up to drill 108 road wheels 128 are elevated off the field so as to only engage field wheels 126 with the field. When hitch 132 is hooked-up to truck 136 field wheels 126 are elevated up off the roadway so as to only engage road wheels 128 with the roadway. Thus truck 136 may travel at highway speeds between a silo facility where agricultural products are stored in bulk, which is at a significant distance from field 110, and a particular field 110 where it is desired to apply the agricultural products. As seen in FIG. 20 truck 136 delivers trailer 122 via roadway 134 onto field 110 so as to pre-position trailer 122 on the field ready for use to refill the bulk bins within trailer 108a on drill 108.

Figure 21:
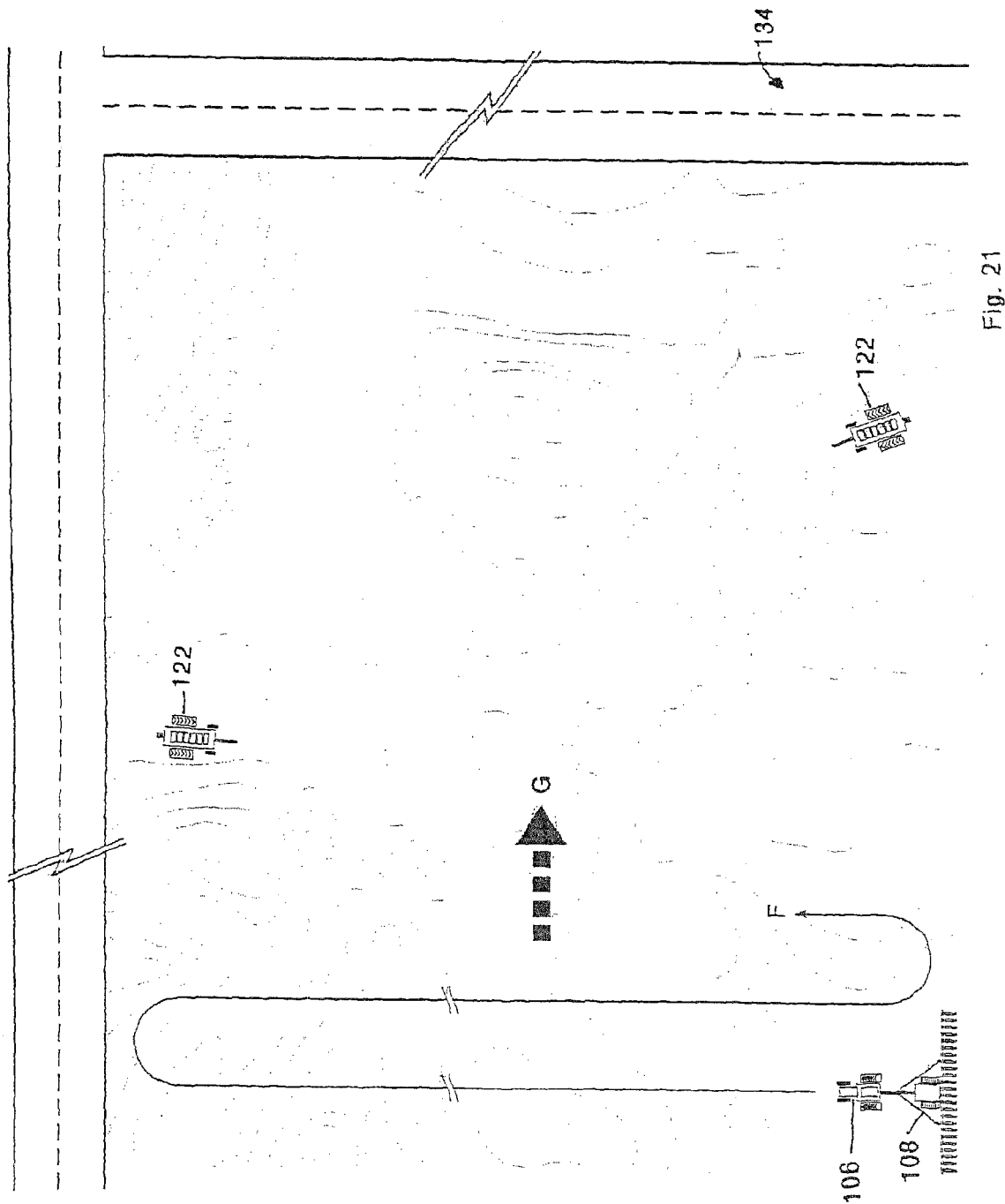
FIG. 21 is the view of FIG. 20 showing the path initially taken by the tractor and drill so as to seed and fertilize the field.
Figure 22:
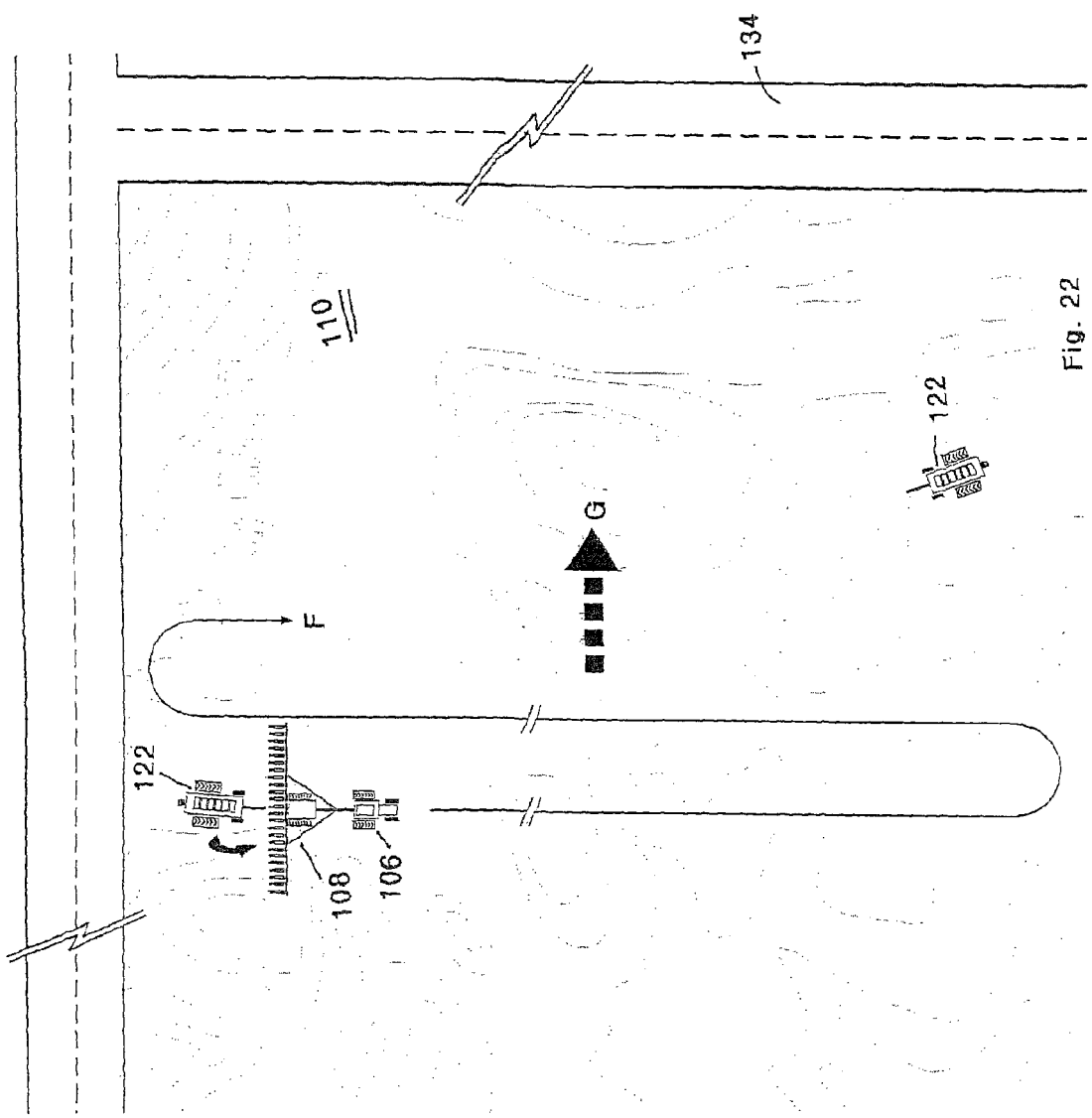
FIG. 22 is the field of 21 wherein the tractor and drill have stopped to hook up the first pre-positioned nurse trailer.

As seen in FIG. 21, tractor 106 and drill 108 follow path F, thus employing a zig-zag pattern commencing at one end at field 110 and so as to progress across the field in direction G while seeding and fertilizing the field according to the field prescription. It will be thus understood that as seeding and fertilizing progresses along path F that, assuming that as seen in FIG. 22 a convertible trailer 122 has its bins fully loaded with agricultural product and has been pre-positioned correctly, tractor 106 and drill 108 will pass in front of trailer 122. Once the tractor and drill have passed closely in front of trailer 122, the trailer and drill may be halted briefly while trailer 122 is hooked onto drill 108 using draw bar 130. Once the trailer 122 has been hooked to drill 108 and the air feed lines (not shown) are attached between corresponding bins 124 on trailer 122 and the bulk bins in trailer 108a, tractor 106 recommences forward motion and the controllers recommence seeding and fertilizing according to the field prescription. Thereafter while the tractor and drill are operational along path F, the bins within trailer 108a are resupplied on-the-fly from the bins 124 in trailer 122 until bins 124 are depleted or the bulk bins within trailer 108 are full.

Once the resupply from trailer 122 has been completed, and bins 124 are empty, the tractor and drill may be momentarily stopped while the air supply hoses are disconnected from trailer 108a and trailer 122 is unhooked from drill 108, whereupon, the tractor and drill recommence progress along path F leaving the emptied trailer 122 behind for pickup by truck 136.

Figure 23:
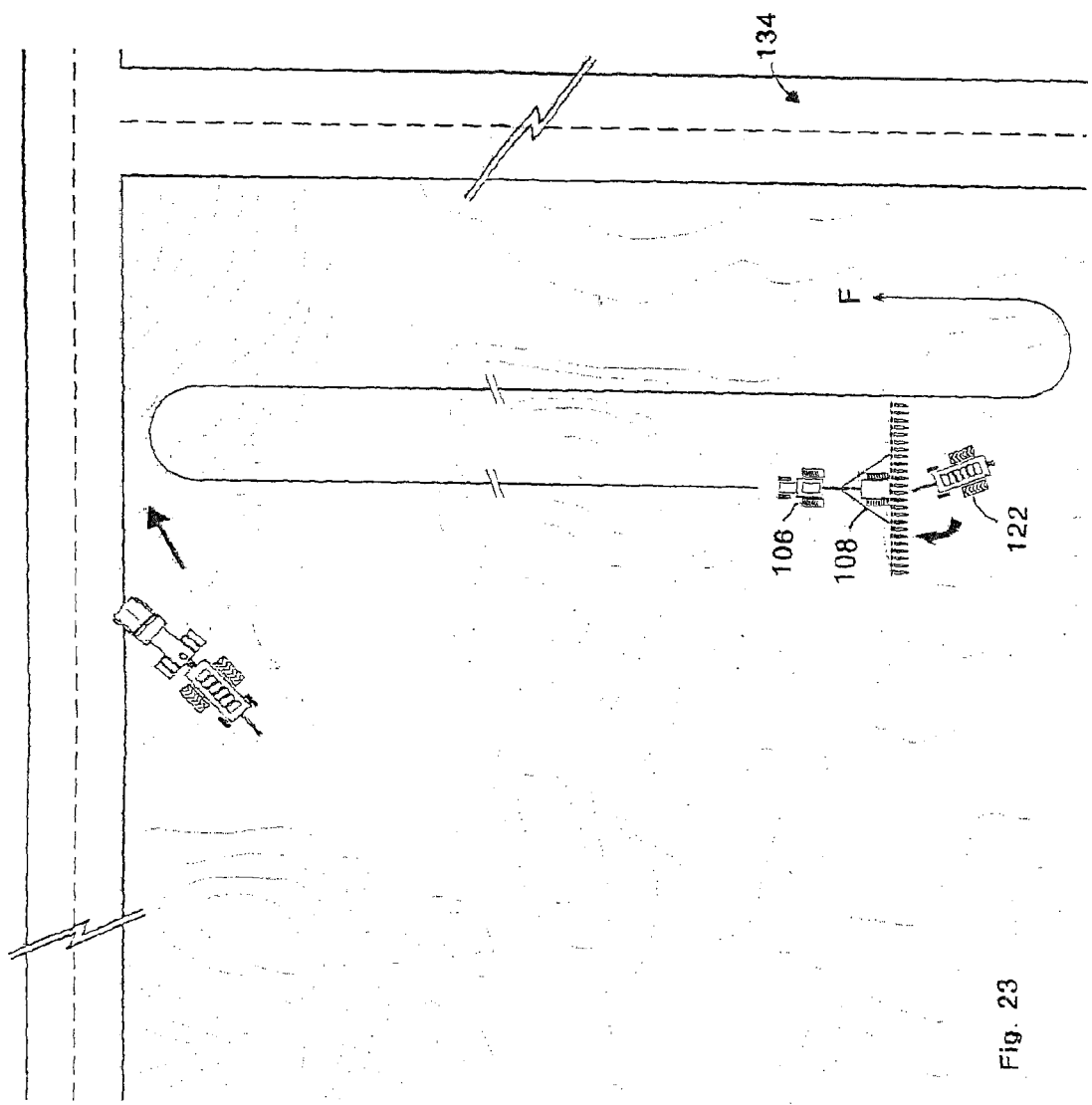
FIG. 23 is the field of 22 wherein an empty nurse trailer is being removed from the field and the tractor and drill have stopped to hook-up the second pre-positioned nurse trailer.

It will be appreciated that truck 136 will return to the silo storage facility with an empty trailer 122 and return to field 110 with a full trailer 122 to pre-position the next trailer 122 where needed. Thus as may be seen in FIG. 23, the tractor and drill have stopped to hook-up the second full trailer 122 for recommencing along path F to complete seeding and fertilizing of the field, and the empty trailer 122 has been removed from the field for refilling at the silo storage facility.

In interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, of steps that are not expressly referenced.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A metering system comprising: a bulk tank associated with a seeding drill, the seeding drill having at least one arm and the bulk tank comprising at least four bulk compartments; and an array of metering pods mounted in a laterally spaced apart array along the at least one arm of the seeding drill, wherein the array has an opener density along the at least one arm corresponding to a lateral resolution of laterally spaced apart data points in a field prescription, said opener density subject to machine constraints defining a lateral width of each pod of the array of metering pods; and wherein the system further comprises a main controller individually controlling said metering assemblies via corresponding pod controllers; and wherein said main controller is adapted to use data inputs, said data inputs including user data inputs and field prescription data inputs and said data inputs further selected from a group comprising: location data inputs from a location device, velocity inputs from a velocity determining device; and wherein at least one processor in said main controller correlates a location of the system on a field with a corresponding field prescription and communicates individual metering instructions to each of said metering assemblies in each pod of said array of metering pods so as to dispense to a corresponding opener a uniquely regulated combination of different agricultural products and so as to provide a delivery rate of said agricultural products from each metering assembly of each said pod to accomplish a desired delivery rate as determined by the at least one processor and a corresponding product spread density of said each regulated combination according to the said field prescription for a particular location on the field.

2. The system of claim 1 wherein a bulk conveyor supplies the different agricultural products from each of the bulk compartments in a one-to-one correspondence between each bulk compartment of the bulk compartments and a corresponding metering assembly of the at least four metering assemblies in each pod.

3. The system of claim 2 wherein said each metering assembly includes a local hopper communicating a corresponding agricultural product of the different agricultural products to a selectively and individually actuatable metering dispenser within said metering assembly.

4. The system of claim 3 wherein each said metering dispenser meters the corresponding agricultural product at a selectively variable rate via a selectively adjustable flow re-director so as to direct agricultural product into a selected opener port of a plurality of opener ports of the corresponding opener of each metering pod.

5. The system of claim 4, wherein the selectively adjustable flow re-director is configured to be actuated by the main controller and corresponding pod controllers.

6. The system of claim 4 wherein each said flow re-director directs the flow of the corresponding agricultural product to the selected opener port through a manifold and wherein the metering dispenser is in communication with the manifold and the opener port via a conduit.

7. The system of claim 6 wherein said manifold includes a chambered flow-control device that controls and directs flows of incoming agricultural products through dividing chambers, and wherein each chamber of the dividing chambers has at least one corresponding outflow outlet.

8. The system of claim 1 wherein said each pod includes a selectively adjustable depth control actuator.

9. The system of claim 8, wherein the selectively adjustable depth control actuator is configured to be actuated by said main controller and said corresponding pod controllers.

10. The system of claim 1 wherein the different agricultural products include granular products, and wherein each said metering assembly is adapted to meter the granular products.

11. The system of claim 1 wherein said metering assemblies each include a metering roller rotatably mounted within a metering cup so as to form a dispensing nip for dispensing singulated granular product to a manifold.

* * * * *